US010697377B2

(12) United States Patent
An et al.

(10) Patent No.: US 10,697,377 B2
(45) Date of Patent: Jun. 30, 2020

(54) TURBINE SUPERCHARGER AND TWO-STAGE SUPERCHARGING SYSTEM

(71) Applicant: MITSUBISHI HEAVY INDUSTRIES ENGINE & TURBOCHARGER, LTD., Sagamihara-shi, Kanagawa (JP)

(72) Inventors: Byeongil An, Tokyo (JP); Hiroshi Suzuki, Tokyo (JP)

(73) Assignee: MITSUBISHI HEAVY INDUSTRIES ENGINE & TURBOCHARGER, LTD., Kanagawa (JP)

( * ) Notice: Subject to any disclaimer, the term of this patent is extended or adjusted under 35 U.S.C. 154(b) by 166 days.

(21) Appl. No.: 15/550,663

(22) PCT Filed: Mar. 30, 2015

(86) PCT No.: PCT/JP2015/059934
§ 371 (c)(1),
(2) Date: Aug. 11, 2017

(87) PCT Pub. No.: WO2016/157364
PCT Pub. Date: Oct. 6, 2016

(65) Prior Publication Data
US 2018/0038290 A1 Feb. 8, 2018

(51) Int. Cl.
F02D 9/10 (2006.01)
F02D 9/04 (2006.01)
(Continued)

(52) U.S. Cl.
CPC .......... F02D 9/1035 (2013.01); F02B 37/004 (2013.01); F02B 37/013 (2013.01);
(Continued)

(58) Field of Classification Search
CPC ...... F02B 37/18; F02B 37/183; F02B 37/186; F02B 37/013; F02B 37/004; F02D 9/1035;
(Continued)

(56) References Cited

U.S. PATENT DOCUMENTS 4,266,753 A * 5/1981 Okada ...................... F16K 1/226
251/305
4,605,201 A * 8/1986 Miyazaki .............. F16K 1/2265
251/305
(Continued)

FOREIGN PATENT DOCUMENTS

EP 2 199 564 A1 6/2010
EP 2 306 053 A1 4/2011
(Continued)

OTHER PUBLICATIONS

Extended European Search Report effective Mar. 12, 2018 issued to the corresponding EP Application 15887517.9.
(Continued)

Primary Examiner — Thai Ba Trieu
(74) Attorney, Agent, or Firm — Birch, Stewart, Kolasch & Birch, LLP

(57) ABSTRACT

A turbine supercharger includes: a turbine; a turbine housing which houses the turbine; and a turbine bypass valve for controlling a flow rate of exhaust gas to be supplied to the turbine. The turbine housing includes, inside the turbine housing: a scroll flow passage for guiding the exhaust gas to the turbine; an outlet flow passage for discharging the exhaust gas supplied to the turbine to outside of the turbine housing; and a bypass flow passage bypassing the turbine and connecting the scroll flow passage and the outlet flow passage. The turbine bypass valve includes: a valve rod; a valve body having a flat plate shape and being configured to revolve about the valve rod; and a valve housing having a (Continued)

cylindrical shape and defining a part of the bypass flow passage inside the valve housing. The valve housing is fixed to an inner peripheral wall surface of the bypass flow passage, inside the turbine housing.

3 Claims, 14 Drawing Sheets

(51) Int. Cl.
*F02B 37/16* (2006.01)
*F02B 37/18* (2006.01)
*F02B 37/013* (2006.01)
*F02B 37/00* (2006.01)

(52) U.S. Cl.
CPC .......... *F02B 37/162* (2019.05); *F02B 37/183* (2013.01); *F02D 9/04* (2013.01); *F02D 9/10* (2013.01); *F02D 9/101* (2013.01); *F02D 9/1065* (2013.01); *Y02T 10/144* (2013.01)

(58) Field of Classification Search
CPC ... F02D 9/04; F02D 9/10; F02D 9/101; F02D 9/1065; Y02T 10/144; F16K 1/226; F16K 1/2263
USPC ............ 60/602, 612; 123/562; 251/305, 306
See application file for complete search history.

(56) References Cited

U.S. PATENT DOCUMENTS

| | | | | |
|---|---|---|---|---|
| 5,148,678 | A * | 9/1992 | Ueda | F02D 9/04 60/602 |
| 5,315,975 | A * | 5/1994 | Hattori | F02D 9/104 251/305 |
| 5,465,696 | A * | 11/1995 | Gmelin | F02D 9/10 251/305 |
| 5,979,871 | A * | 11/1999 | Forbes | F02D 9/1045 251/305 |
| 6,000,222 | A * | 12/1999 | Regnier | F01D 9/026 60/605.2 |
| 6,338,467 | B1 * | 1/2002 | Mabboux | F16K 1/2263 251/305 |
| 6,698,717 | B1 * | 3/2004 | Brookshire | F16K 1/222 251/305 |
| 7,607,302 | B2 * | 10/2009 | Fry | F02B 37/013 60/612 |
| 2007/0062188 | A1 | 3/2007 | Fry et al. | |
| 2009/0133669 | A1 | 5/2009 | Ishihara et al. | |
| 2009/0265080 | A1 | 10/2009 | Fry et al. | |
| 2010/0187460 | A1 | 7/2010 | An et al. | |
| 2011/0272613 | A1 | 11/2011 | Watanuki et al. | |
| 2012/0000196 | A1 | 1/2012 | Niwa et al. | |
| 2012/0181468 | A1 * | 7/2012 | Telep | F16K 1/224 251/304 |
| 2013/0299728 | A1 * | 11/2013 | Yokoyama | F16K 1/2263 251/306 |
| 2015/0040561 | A1 * | 2/2015 | Matsui | F02B 37/183 60/602 |
| 2016/0061333 | A1 * | 3/2016 | Bareis | F16K 1/2263 251/306 |

FOREIGN PATENT DOCUMENTS

| | | | | |
|---|---|---|---|---|
| EP | 2 365 200 | A1 | 9/2011 | |
| JP | 05296067 | A * | 11/1993 | ............ F02D 9/104 |
| JP | 2007-505257 | A | 3/2007 | |
| JP | 2009-92026 | A | 4/2009 | |
| JP | 2011-69482 | A | 4/2011 | |
| JP | 5375151 | B2 | 12/2013 | |
| JP | 5499953 | B2 | 5/2014 | |
| JP | 2014-105674 | A | 6/2014 | |
| JP | 2014231804 | A * | 12/2014 | ............ F16K 1/226 |
| WO | WO-9506809 | A1 * | 3/1995 | ............ F02D 9/101 |

OTHER PUBLICATIONS

2nd Office Action dated Aug. 17, 2018 in the corresponding Japanese Application No. 2017-508887 with a Machine Translation.
Office Action dated Apr. 3, 2018 in the corresponding Japanese Application No. 2017-508887 with a Machine Translation.
Office Action dated Dec. 12, 2018 issued in the corresponding EP Application No. 15 887 517.9.
International Preliminary Report on Patentability and Written Opinion of the International Searching Authority (Forms PCT/IB/373, PCT/IB/338, PCT/IB/326 and PCT/ISA/237) for International Application No. PCT/JP2015/059934, dated Oct. 12, 2017, with an English translation.
International Search Report and Written Opinion of the International Searching Authority (Forms PCT/ISA/210, PCT/ISA/220 and PCT/ISA/237) for International Application No. PCT/JP2015/059934, dated Jun. 30, 2015.
Office Action dated Mar. 22, 2019 issued to the corresponding CN Application No. 201580077511.6.

* cited by examiner (H1 ≦ d)

(H1' > d')

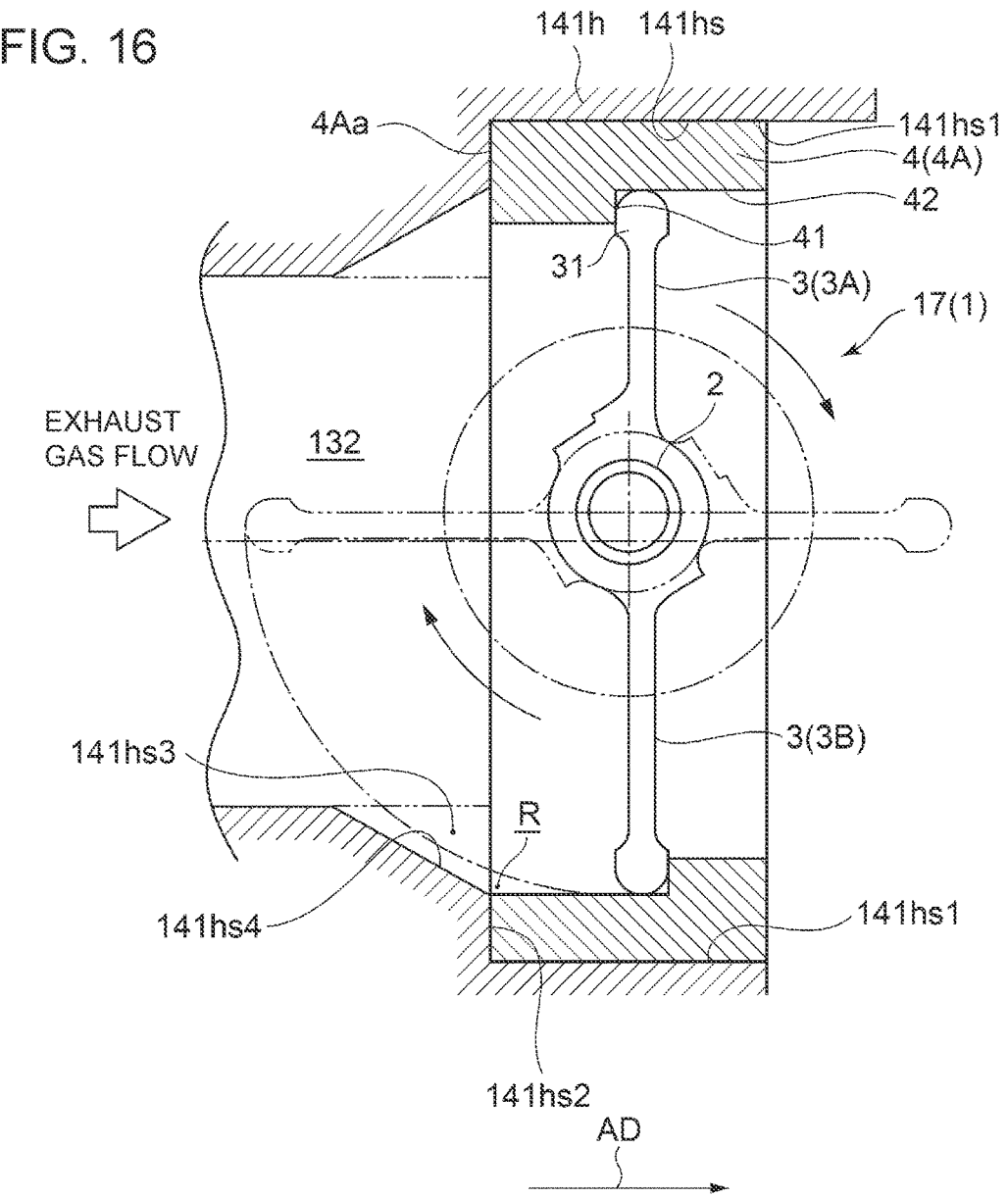

TURBINE SUPERCHARGER AND TWO-STAGE SUPERCHARGING SYSTEM

This application is a US National Phase Application under 35 U.S.C. 371 of International Application No. PCT/JP2015/059934 filed on Mar. 30, 2015.

TECHNICAL FIELD

The present disclosure relates to a turbine supercharger, and a two-stage supercharging system provided with two turbine superchargers: a high-pressure stage supercharger and a low-pressure stage supercharger.

BACKGROUND ART

Typically, a known two-stage supercharging system is provided with a high-pressure stage supercharger having a high-pressure stage turbine configured to be driven by exhaust gas discharged from an exhaust manifold, and a low-pressure stage supercharger having a low-pressure stage turbine being disposed downstream of the high-pressure stage supercharger in an exhaust system and configured to be driven by exhaust gas discharged from the high-pressure stage supercharger. Such a two-stage supercharging system has been employed in an automobile diesel engine or the like in particular.

In the mid or low speed operational range of an engine, performing two-stage supercharging (complete two-stage supercharging) in which both of the high-pressure stage supercharger and the low-pressure stage supercharger are driven is advantageous in terms of improvement of the low-speed torque and the transient property of the engine. On the other hand, in the high speed operational range of an engine, performing one-stage supercharging with the low-pressure stage supercharger with exhaust gas bypassed from the high-pressure stage supercharger makes it possible to achieve a higher compressor efficiency, thereby realizing stable operation with flexible matching.

Furthermore, in the intermediate range between the above described full two-stage supercharging and the one-stage supercharging, variable two-stage supercharging is performed, in which the low-pressure stage supercharger is driven while controlling the flow rate of exhaust gas supplied to the high-pressure stage supercharger to control driving of the high-pressure stage supercharger. In this variable two-stage supercharging, the opening degree of a high-pressure stage turbine bypass valve (exhaust flow control valve) disposed between the exhaust manifold and the high-pressure stage supercharger is regulated, and thereby the flow rate of exhaust gas supplied to the high-pressure stage supercharger is changed in accordance with the target output of the engine.

Furthermore, in the high-speed operational range of the engine, if there is a risk of overboost of the engine, a control is performed to regulate the opening degree of a low-pressure side turbine bypass valve (waste-gate valve) disposed between the high-pressure stage supercharger and the low-pressure stage supercharger to reduce the flow rate of exhaust gas supplied to the low-pressure stage supercharger.

As described above, typically, a flap type valve has been often employed as an exhaust-flow-rate control valve such as the high-pressure stage turbine bypass valve and the low-pressure stage turbine bypass valve, as disclosed in Patent Document 1 for instance.

Citation List

Patent Literature

Patent Document 1: JP2009-92026A
Patent Document 2: JP5499953B

SUMMARY

Problems to be Solved

Meanwhile, amid the recent trend to improve the output of engines, an actuator for opening and closing a flap type exhaust-flow-rate control valve is required to have a high output. In this context, adoption of another type of valve is considered, such as a butterfly type valve capable of opening and closing with a smaller output than a flap type valve (Patent Document 2). In Patent Document 2, a butterfly-type exhaust-flow-rate control valve is used as a high-pressure stage turbine bypass valve for controlling the flow rate of exhaust gas supplied to the high-pressure stage supercharger.

In patent Document 2, the above described high-pressure stage turbine bypass valve (reference numeral 44) is disposed in the first bypass passage (reference numeral 43) branched from an introduction passage (reference numeral 42) for supplying the high-pressure stage supercharger (reference numeral 7) with exhaust gas from the exhaust manifold and connecting to the turbine housing (reference numeral 32) of the low-pressure stage supercharger (reference numeral 8). Further, an inter-turbine passage (reference numeral 41) connecting the high-pressure stage supercharger and the low-pressure stage supercharger is disposed in parallel to the first bypass passage. Further, the above described high-pressure stage turbine bypass valve is disposed integrally with an intermediate member (reference numeral 53) having two openings: one forming a part of the first bypass passage, and the other one forming a part of the inter-turbine passage. The intermediate member is held between the first unit portion (reference numeral 51) and the second unit portion (reference numeral 52) and is thereby fixed.

According to Patent Document 2, there are many layout limitations regarding assembly of an exhaust-flow-rate control valve such as a high-pressure stage turbine bypass valve with the two-stage supercharging system, and it is difficult to configure the entire system compactly.

At least one embodiment of the present invention was made in view of the above problem of typical art, and an object is to provide a compact turbine supercharger and a two-stage supercharging system provided with an exhaust-flow-rate control valve of a butterfly-type.

Solution to the Problems (1) A turbine supercharger according to at least one embodiment of the present invention comprises: a turbine; a turbine housing which houses the turbine; and a turbine bypass valve for controlling a flow rate of exhaust gas to be supplied to the turbine. The turbine housing includes, inside the turbine housing: a scroll flow passage for guiding the exhaust gas to the turbine; an outlet flow passage for discharging the exhaust gas supplied to the turbine to outside of the turbine housing; and a bypass flow passage bypassing the turbine and connecting the scroll flow passage and the outlet flow passage. The turbine bypass valve comprises: a valve rod; a valve body having a flat plate shape and being configured to revolve about the valve rod; and a valve housing having a cylindrical shape and defining a part of the bypass flow passage inside the valve housing, the valve housing including: a valve seat surface being formed on an inner peripheral surface of the valve housing, extending along a direction intersecting with an axial direction of the bypass flow passage, and being configured to make contact with an outer peripheral portion of the valve body in a fully-closed state in which an opening degree of the valve body is zero degree; and a flow passage surface being formed on the inner peripheral surface of the valve housing, extending along the axial direction of the bypass flow passage, and defining a passage region through which the exhaust gas passes between the flow passage surface and the outer peripheral portion of the valve body in a valve-open state in which the opening degree of the valve body is greater than zero degree. The valve housing is fixed to an inner peripheral wall surface of the bypass flow passage inside the turbine housing.

According to the embodiment in the above (1), the turbine bypass valve includes the valve rod, the valve body of a flat plate shape revolvable about the valve rod, and the valve housing with the valve seat surface to make contact with the outer peripheral portion of the valve body in the fully-closed state, extending along a direction that intersects with the axial direction of the exhaust flow passage, and the flow passage surface defining the passage region through which exhaust gas passes between the flow passage surface and the outer peripheral portion of the valve body in the valve-open state, extending along the axial direction of the exhaust flow passage, formed on the inner peripheral surface of the valve housing, thus being a butterfly type turbine bypass valve (exhaust-flow-rate control valve). Thus, compared to a typical flap-type turbine bypass valve, the valve body can be opened and closed with a small output, and thus it is possible to reduce the size of the actuator.

According to the embodiment in the above (1), the bypass flow passage bypassing the turbine is formed inside the turbine housing, and the turbine bypass valve is disposed inside the turbine housing. Thus, compared to a case in which the bypass flow passage is formed outside the turbine housing and the turbine bypass valve is disposed outside the turbine housing, it is possible to reduce the size of the turbine supercharger.

(2) In some embodiments, in the turbine supercharger according to the above (1), the valve housing includes a seating portion having a cylindrical shape and including an inner peripheral surface on which the valve seat surface and the flow passage surface are formed integrally, and the seating portion is fixed to the inner peripheral wall surface of the bypass flow passage inside the turbine housing.

According to the embodiment in the above (2), the valve housing includes the seating portion of a cylindrical shape having an inner peripheral surface on which the valve seat surface and the flow passage surface are formed integrally. Thus, compared to a case in which the valve housing is formed separately from the valve seat surface and the flow passage surface, the assembling performance is improved.

(3) In some embodiments, in the turbine supercharger according to the above (2), a flat surface and a step portion extending inward from an upstream end of the flat surface are formed on the inner peripheral wall surface of the bypass flow passage. The seating portion is configured such that an end surface of the seating portion and the step portion are in contact with each other while the seating portion is fixed to the inner peripheral wall surface of the bypass flow passage.

According to the embodiment in the above (3), to insert the seating portion into the turbine housing from the opening end of the outlet flange portion of the turbine housing, the seating portion merely needs to be inserted until coming into contact with the step portion formed on the inner peripheral wall surface of the bypass flow passage. Thus, the position of the seating portion can be determined easily and the seating portion has a high workability.

(4) In some embodiments, in the turbine supercharger according to the above (3), a width increasing portion increasing an inner cross section from upstream toward downstream is formed on the inner peripheral wall surface of the bypass flow passage, at a position upstream of the step portion. Provided that, when the valve body transitions from the fully-closed state to the valve-open state, a first side is a side at which the outer peripheral portion of the valve body rotates toward a downstream side of the bypass flow passage and a second side is a side at which the outer peripheral portion of the valve body rotates toward an upstream side of the bypass flow passage, the outer peripheral portion of the valve body disposed on the second side is configured to pass through the width increasing portion.

According to the embodiment in the above (4), the width increasing portion increasing the width of the inner cross section from upstream toward downstream is formed on the inner peripheral wall surface of the bypass flow passage, at a position upstream of the step portion. Accordingly, it is possible to reduce pressure loss when exhaust gas flows through portions having different sizes in the inner cross section. Further, it is possible to reduce the size of the bypass flow passage through a configuration in which the outer peripheral portion of the valve body disposed on the second side passes through the width increasing portion, thus reducing the overall size of the turbine housing.

(5) A two-stage supercharging system according to at least one embodiment of the present invention comprises: an engine; an exhaust manifold into which exhaust gas discharged from the engine is introduced; an exhaust system through which the exhaust gas discharged from the exhaust manifold flows; a high-pressure stage supercharger having a high-pressure stage turbine configured to be driven by the exhaust gas discharged from the exhaust manifold; and a low-pressure stage supercharger comprising a low-pressure stage turbine which is disposed downstream of the high-pressure stage supercharger in the exhaust system and which is configured to be driven by the exhaust gas discharged from the high-pressure stage supercharger. The high-pressure stage supercharger comprises the turbine supercharger according to any one of the above (1) to (4).

According to the embodiment in the above (5), the high-pressure side bypass flow passage bypassing the high-pressure stage turbine is formed inside the high-pressure stage turbine housing, and the high-pressure stage turbine bypass valve is disposed inside the high-pressure stage turbine housing. Thus, compared to a case in which the high-pressure side bypass flow passage and the high-pressure stage turbine bypass valve are formed outside the high-pressure stage turbine housing, it is possible to reduce the overall size of the two-stage supercharging system.

Furthermore, according to the embodiment in the above (5), the high-pressure stage turbine bypass valve is disposed inside the high-pressure side bypass flow passage. Thus, compared to a typical case in which the high-pressure stage turbine bypass valve is disposed between the exhaust manifold and the high-pressure stage turbine housing, the high-pressure stage turbine bypass valve is disposed downstream, and thus the temperature of exhaust gas passing through the high-pressure stage turbine bypass valve decreases. Thus, compared to a typical case, the high-pressure stage turbine bypass valve is less likely to be affected by thermal deformation, and has an improved reliability. Further, compared to a typical case, the high-pressure stage turbine bypass valve can be composed of less thermally-resistant and less expensive materials.

(6) In some embodiments, in the two-stage supercharging system according to the above (5), the low-pressure stage supercharger comprises the turbine supercharger according to any one of the above (1) to (4).

According to the embodiment in the above (6), both of the high-pressure stage supercharger and the low-pressure stage supercharger comprise a turbine supercharger as described above, including a turbine bypass valve disposed inside the turbine housing. Thus, it is possible to reduce the overall size of the two-stage supercharging system, compared to a case in which the high-pressure side bypass flow passage and the low-pressure side bypass flow passage are formed outside the high-pressure stage turbine housing and the low-pressure stage turbine housing, respectively, and the high-pressure stage turbine bypass valve and the low-pressure stage turbine bypass valve are formed outside the high-pressure stage turbine housing and the low-pressure stage turbine housing, respectively.

Advantageous Effects

According to at least one embodiment of the present invention, it is possible to provide a compact two-stage turbine supercharging system provided with a butterfly-type exhaust-flow-rate control valve as a waste-gate valve.

BRIEF DESCRIPTION OF DRAWINGS

FIG. 16 is an enlarged cross-sectional view of a turbine bypass valve disposed inside the turbine housing.

DETAILED DESCRIPTION

Figure 1:
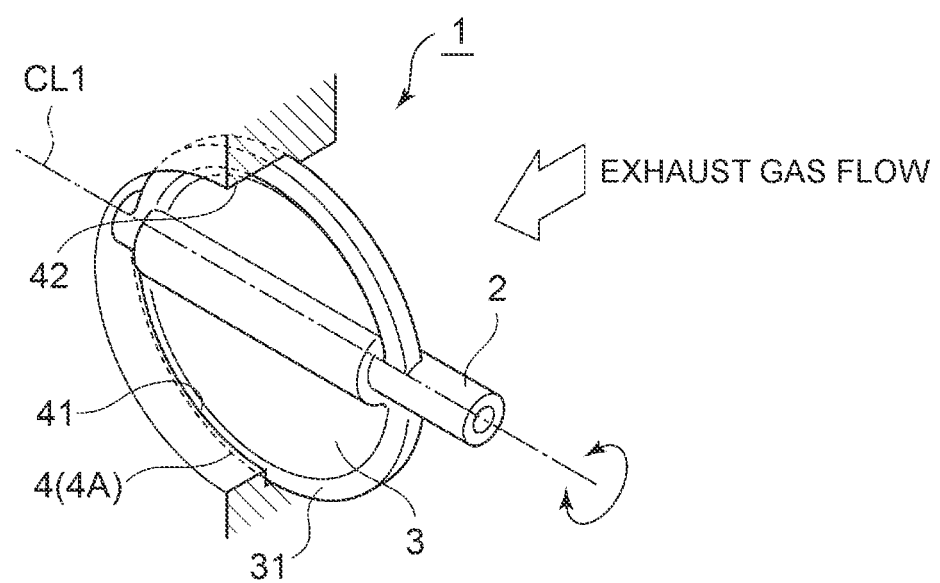
FIG. 1 is a perspective view of an exhaust-flow-rate control valve according to an embodiment of the present invention.

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Further, in the description below, some the same features are associated with the same reference numerals and not described again.

FIG. 1 is a perspective view of an exhaust-flow-rate control valve according to an embodiment of the present invention. FIGS. 2 to 5 are each a cross-sectional view of an exhaust-flow-rate control valve according to an embodiment of the present invention, as seen in a direction perpendicular to the axis (in a direction perpendicular to the center axis of a valve rod).

An exhaust-flow-rate control valve 1 according to an embodiment of the present invention is an exhaust-flow-rate control valve for controlling the flow rate of exhaust gas flowing through an exhaust flow passage, and includes a valve rod 2, a valve body 3, and a valve housing 4, as shown in FIG. 1.

The valve rod 2 is configured to rotate about the center axis CL1 of the valve rod 2 in response to an output from an actuator (not depicted).

The valve body 3 is a flat plate-shaped member fixed to the valve rod 2, and is configured to revolve about the valve rod 2.

The valve housing 4 is a cylindrical member defining a part of an exhaust flow passage inside thereof. A valve seat surface 41 and a flow passage surface 42 are formed on an inner peripheral surface of the valve housing 4.

As shown in FIGS. 2 to 5, the valve seat surface 41 is a surface that makes contact with the outer peripheral portion 31 of the valve body 3 in a fully-closed state in which the opening degree of the valve body 3 is zero (the state indicated by reference sign A in FIGS. 2 to 5), and extends along a direction intersecting with the axial direction (direction shown by arrows AD in FIGS. 2 to 5) of the exhaust flow passage.

As shown in FIGS. 2 to 5, the flow passage surface 42 is a surface that defines a passage region R through which exhaust gas passes between the surface and the outer peripheral portion 31 of the valve body 3 in a valve-open state in which the opening degree of the valve body 3 is greater than zero (the state indicated by reference sign B in FIGS. 2 to 5), and extends along the axial direction AD of the exhaust flow passage.

In the depicted embodiment, the valve seat surface 41 extends in a direction perpendicular to the axial direction AD of the exhaust flow passage, but the extending direction of the valve seat surface 41 is not limited to this. The scope of the present invention includes at least an angle in a range of 30 degree to 90 degrees (perpendicular), formed between the axial direction AD of the exhaust flow passage and the extending direction of the valve seat surface 41.

In the depicted embodiment, the flow passage surface 42 extends in a direction parallel to the axial direction AD of the exhaust flow passage, but the extending direction of the flow passage surface 42 is not limited to this. The scope of the present invention includes at least an angle in a range of 0 degree (parallel) to 45 degrees, formed between the axial direction AD of the exhaust flow passage and the extending direction of the flow passage surface 42.

Furthermore, as shown in FIGS. 2 to 5, the exhaust-flow-rate control valve 1 according to an embodiment of the present invention is configured to satisfy the following expressions (1) and (2), provided that L is the horizontal distance from a predetermined position 42a of the flow passage surface 42 that becomes closest to the valve body 3 when the valve body 3 is in the fully-closed state to an end portion 42b of the flow passage surface 42, H1 (Ha1, Hb1) is the shortest distance between the flow passage surface 42 and the valve body 3 when the valve body 3 is in the fully-closed state, and H2 (Ha2, Hb2) is the shortest distance between the end portion 42b of the flow passage surface 42 and the valve body 3 when the valve body 3 is in a predetermined valve-open state (shown by reference sign B in FIGS. 2 to 5) in which the separation distance between an end portion of the flow passage surface 42 and the valve body 3 is shortest.

$$H1 \leq H2 \quad (1)$$

$$0 < H2/L < 0.40 \quad (2)$$

According to this embodiment, the exhaust-flow-rate control valve 1 includes the valve rod 2, the valve body 3 of a flat plate shape revolvable about the valve rod 2, and the valve housing 4 with the valve seat surface 41 to make contact with the outer peripheral portion 31 of the valve body 3 in the fully-closed state, extending along a direction that intersects with the axial direction AD of the exhaust flow passage, and the flow passage surface 42 defining the passage region R through which exhaust gas passes between the flow passage surface 42 and the outer peripheral portion 31 of the valve body 3 in the valve-open state, extending along the axial direction AD of the exhaust flow passage, formed on the inner peripheral surface of the valve housing 4, thus being a butterfly type exhaust-flow-rate control valve. Thus, the valve body 3 can be opened and closed with a small output compared to a typical flap type exhaust-flow-rate control valve, and thus it is possible to reduce the size of the actuator.

Further, with the above expressions (1) and (2) being satisfied, the passage region R of exhaust gas slowly increases while the valve body 3 transitions from the fully-closed state to the above described predetermined valve-open state. Accordingly, it is possible to control the flow rate of exhaust gas precisely while the opening degree of the valve body 3 is in the range of from zero degree to α degree, which is the opening degree of the valve body 3 in the above described predetermined valve-open state. This point will be described in detail with reference to FIGS. 6 and 7.

Figure 5:
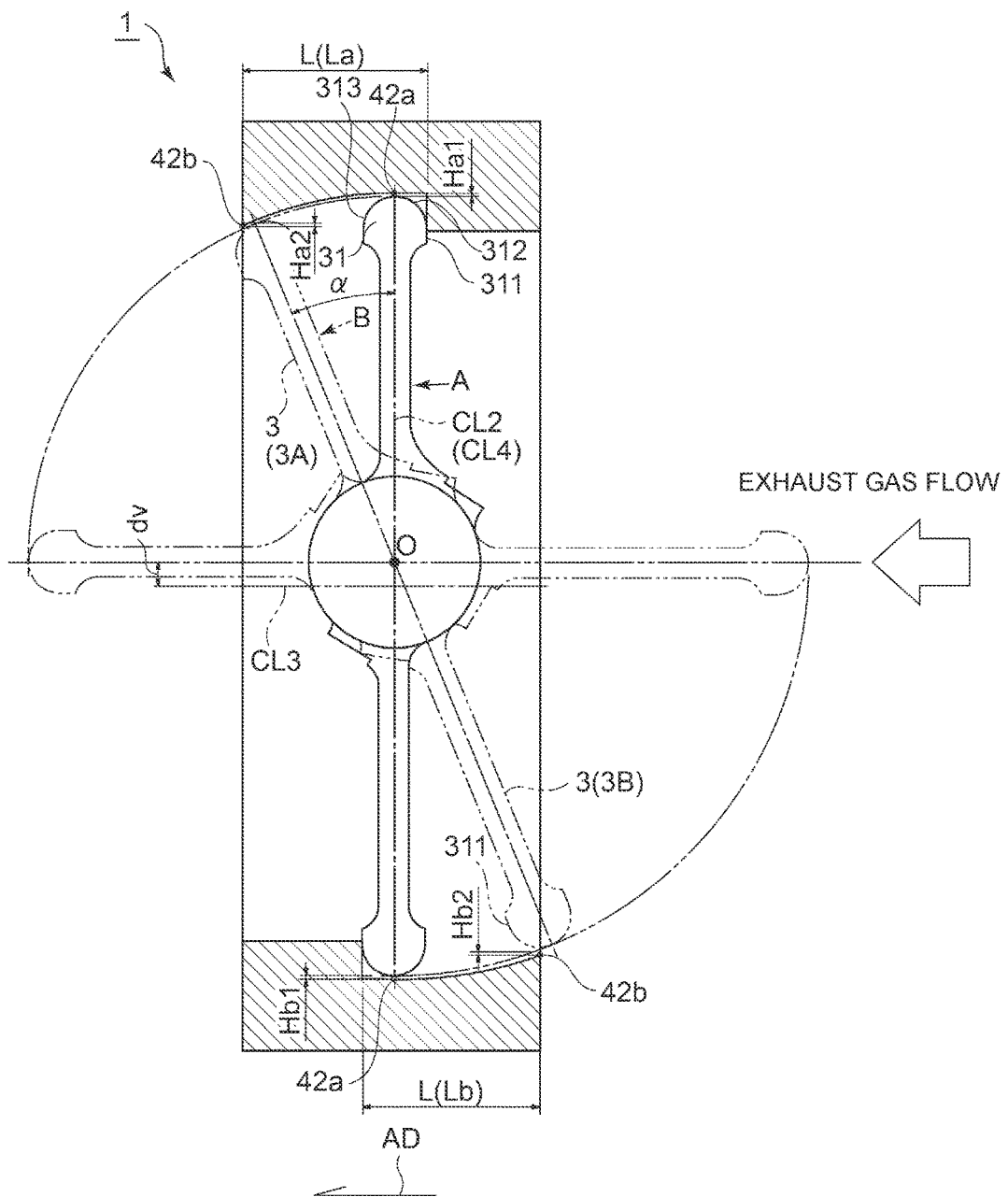
FIG. 5 is a cross-sectional view of an exhaust-flow-rate control valve according to an embodiment of the present invention, as seen in a direction perpendicular to the axis.
Figure 6:
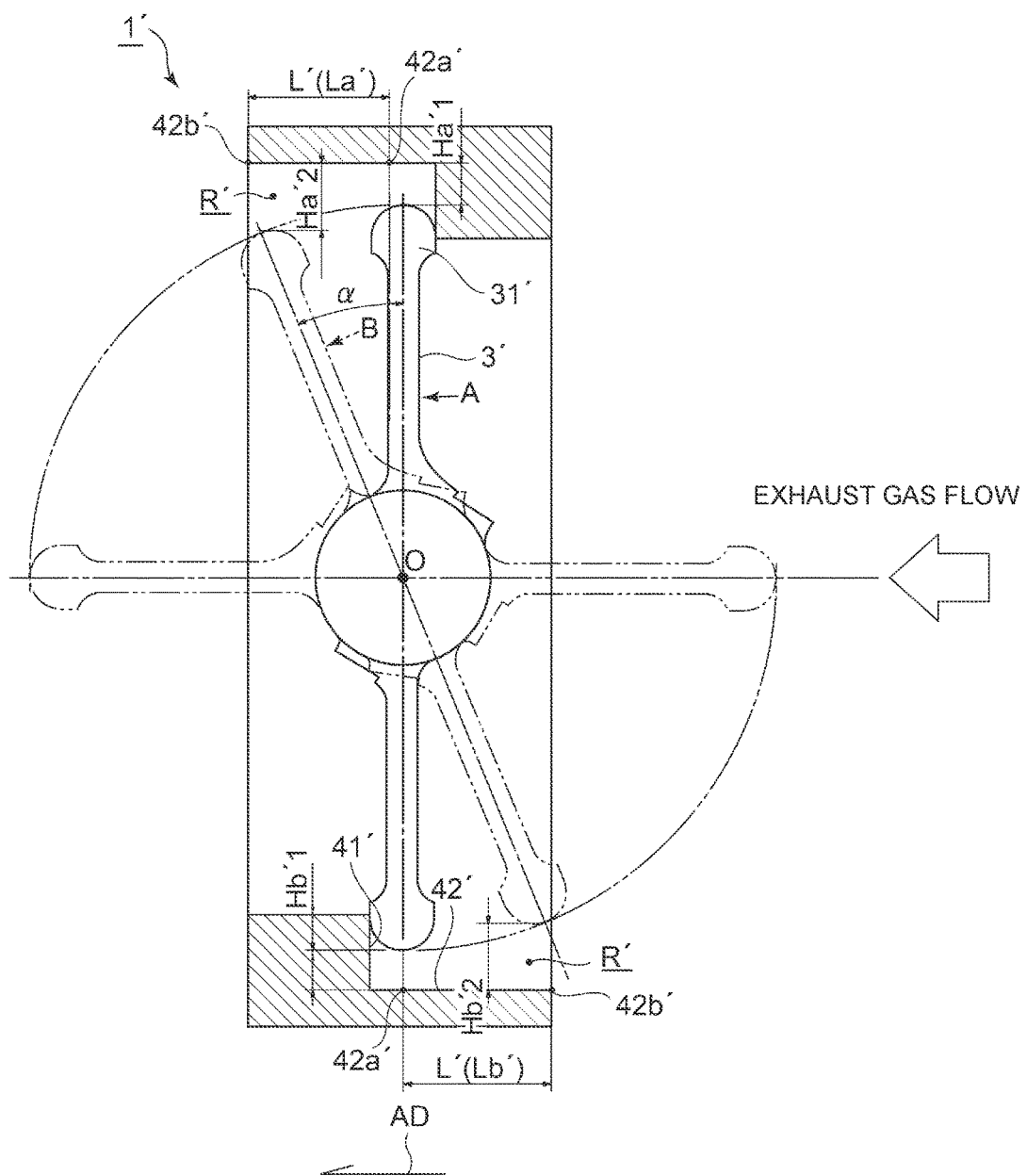
FIG. 6 is a cross-sectional view of an exhaust-flow-rate control valve according to a comparative example, as seen in a direction perpendicular to the axis.

FIG. 6 is a cross-sectional view of an exhaust-flow-rate control valve according to a comparative example, as seen in a direction perpendicular to the axis. As shown in FIG. 6, the shortest distance H1' (Ha'1, Hb'1) between the valve body 3' and the flow passage surface 42' when the valve body 3' is in the fully-closed state in the exhaust-flow-rate control valve 1' of the comparative example is considerably greater than the shortest distance H1 in the exhaust-flow-rate control valve 1 shown in FIGS. 2 to 5. In other words, in the exhaust-flow-rate control valve 1 according to an embodiment of the present invention, the shortest distance H1 is set to be as small as possible so that the flow rate of exhaust gas passing through the passage region R does not increase rapidly while the opening degree of the valve body 3 increases from zero degree to a degree. In contrast, in the exhaust-flow-rate control valve 1 of the comparative example, the shortest distance H1' (Ha'1, Hb' 1) is set to be great so that a great amount of exhaust gas passes through the passage region R' as soon as the valve body 3' transitions from the fully-closed state to the valve-open state.

Figure 7:
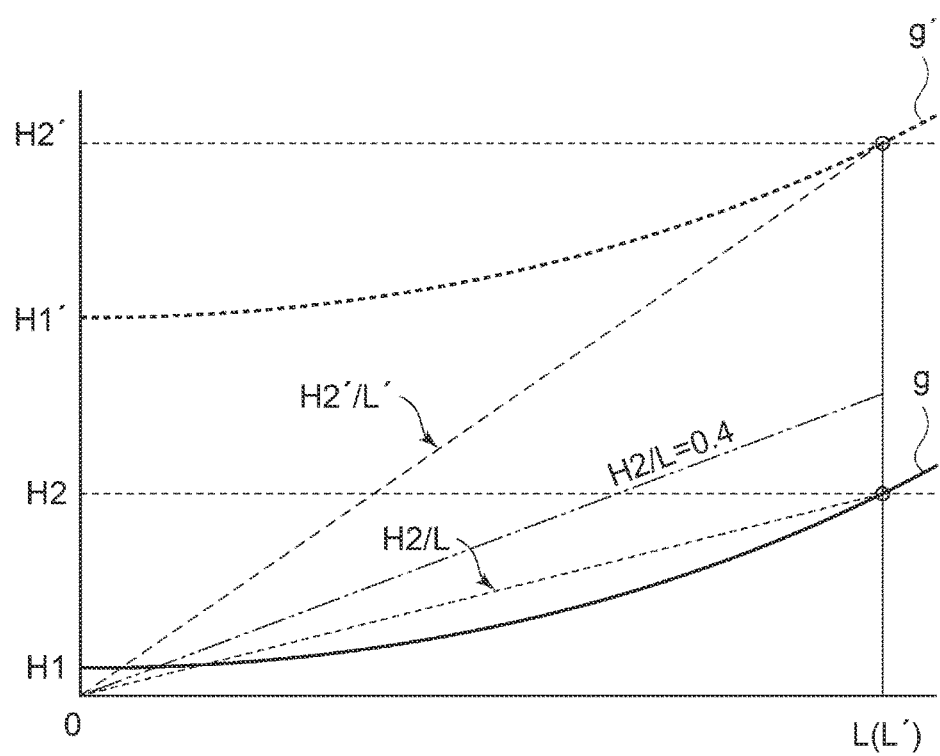
FIG. 7 is a graph where x-axis is horizontal distance and y-axis is passing distance.

FIG. 7 is a graph where x-axis is horizontal distance and y-axis is passing distance (shortest distance between the outer peripheral portion of the valve body and the flow passage surface). The solid line graph g in the drawing represents a relationship between horizontal distance L and passing distance H according to an embodiment of the present invention. The dotted line graph g' in the drawing represents a relationship between horizontal distance L' and passing distance H' according to a comparative example.

As shown in FIG. 7, in an embodiment of the present invention, the shortest distance H1 is set to be small, and thus the average slope H2/L of the graph g is smaller than that of the comparative example. In contrast, in the comparative example, the shortest distance H1' is set to be great, and thus the average slope H2'/L' of the graph g' is greater than that of an embodiment of the present invention.

According to the studies by the present inventors, with the average slope of the graph g satisfying a relationship 0<H2/L<0.40, it is possible to precisely control the flow rate of exhaust gas while the opening degree of the valve body 3 is from zero degree to α degree.

Furthermore, according to the studies by the present inventors, with the average slope of the graph g satisfying a relationship 0<H2/L<0.30, it is possible to control the flow rate of exhaust gas more precisely than the above embodiment.

Furthermore, according to the studies by the present inventors, with the average slope of the graph g satisfying a relationship 0<H2/L<0.25, it is possible to control the flow rate of exhaust gas even more precisely than the above embodiment.

Furthermore, according to the studies by the present inventors, with the average slope of the graph g satisfying a relationship 0<H2/L<0.20, it is possible to control the flow rate of exhaust gas even more precisely than the above embodiment.

In the depicted embodiment, provided that, when the above described valve body 3 transitions from the fully-closed state to the valve-open state, the first side is a side where the outer peripheral portion 31 of the valve body 3 rotates toward the downstream side of the exhaust flow passage and the second side is a side where the outer peripheral portion 31 of the valve body 3 rotates toward the upstream side of the exhaust flow passage, the shortest distance H1 (Ha1) between the flow passage surface 42 and the valve body 3 (3A) of the first side is equal to the shortest distance H1 (Hb1) between the flow passage surface 42 and the valve body 3 (3B) of the second side. However, the present invention is not limited to this. The shortest distance Ha1 of the first side and the shortest distance Hb1 of the second side may be different as long as the first side and the second side both satisfy the relationship of the above expressions (1) and (2). Furthermore, in the depicted embodiment, the horizontal distance L (La) on the flow passage surface 42 of the first side is equal to the horizontal distance L (Lb) on the flow passage surface 42 of the second side. However, the present invention is not limited to this. The horizontal distance La of the first side and the horizontal distance Lb of the second side may be different as long as the first side and the second side both satisfy the relationship of the above expression (2).

In some embodiments, in the exhaust-flow-rate control valve 1 shown in FIGS. 1 to 5, the outer peripheral portion 31 of the valve body 3 has a recessed portion 312 formed thereon, on the side closer to the seat surface 311 in contact with the valve seat surface 41 than the center axis CL2 in the thickness direction of the valve body 3. Furthermore, the shortest distance H1 is such a distance that a corner portion of the outer peripheral portion 31 of the valve body 3 makes contact with the flow passage surface 42 at rotation of the valve body 3, assuming that the recessed portion 312 is not formed on the outer peripheral portion 31 of the valve body 3.

Figure 8A:
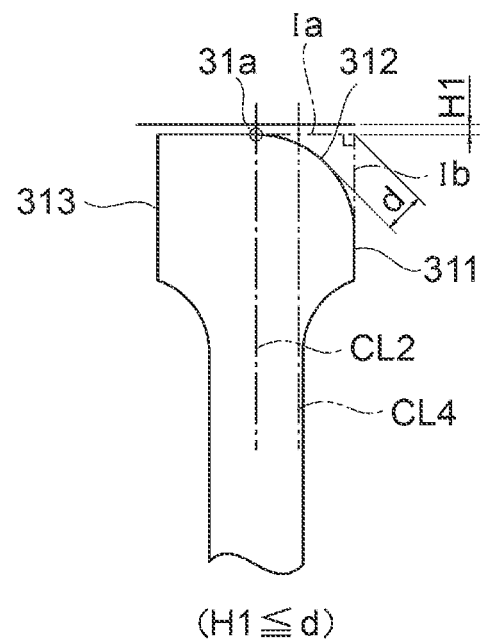
FIGS. 8A and 8B are each an enlarged view of an outer peripheral portion of a valve body according to an embodiment and a comparative example.
Figure 8B:
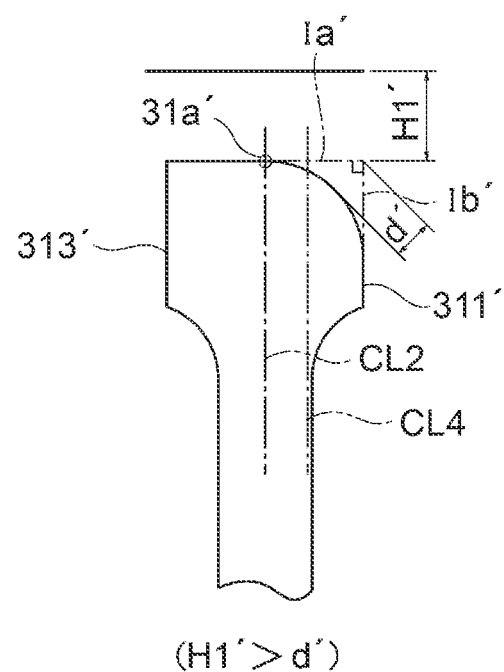

FIGS. 8A and 8B are enlarged views of an outer peripheral portion of a valve body according to an embodiment and a comparative example. FIG. 8A shows the outer peripheral portion of the valve body according to an embodiment of the present invention, and FIG. 8B shows the outer peripheral portion of the valve body of a comparative example.

Herein, as shown in FIGS. 8A and 8B, "recessed portion" refers to a portion disposed on a position recessed from a virtual shape defined by a virtual line Ia (Ia') passing through the seat surface 311 of the valve body 3 in the fully-closed state, and a virtual line Ib (Ib') passing through the tip 31a of the valve body 3 separated from the flow passage surface 42 by the shortest distance H1 in the fully-closed state and extending in a direction perpendicular to the virtual line Ia (Ia'), in a cross-sectional view in a direction perpendicular to the center axis CL1 of the valve rod 2.

Herein, reference numerals 311' and 312' in FIG. 8B respectfully refer to a sent surface 311' and a side surface 313' opposite to the seat surface 311' in the comparative example.

According to this embodiment, the above described recessed portion 312 is formed on the outer peripheral portion 31 of the valve body 3, and thereby the outer peripheral portion 31 of the valve body 3 does not make contact with the flow passage surface 42 even when the valve body 3 revolves. Thus, it is possible to reduce the above described shortest distance H1 to the vicinity of the design limit. For instance, it is possible to set the shortest distance H1 as a distance obtained by adding a production tolerance to the thermal expansion amount of the valve body 3 (the amount of radial expansion of the valve body 3 due to high-temperature exhaust gas). Accordingly, it is possible to control the flow rate of exhaust gas precisely while the opening degree of the valve body 3 is in the range of from zero degree to α degree described above.

In some embodiments, in the exhaust-flow-rate control valve 1 shown in FIGS. 1 to 5, the outer peripheral portion 31 of the valve body 3 has a recessed portion 312 formed thereon, on the side closer to the seat surface 311 in contact with the valve seat surface 41 than the center axis CL2 in the thickness direction of the valve body 3. Further, provided that d is the depth of the recessed portion 312, a relationship H1≤d is satisfied.

Herein, as shown in FIGS. 8A and 8B, "depth of recessed portion" refers to the shortest distance from the intersection between the above described virtual lines Ia and Ib to the outer peripheral portion 31 of the valve body 3.

According to this embodiment, the above described recessed portion 312 is formed on the outer peripheral portion 31 of the valve body 3, and thereby the outer peripheral portion 31 of the valve body 3 does not make contact with the flow passage surface 42 even when the valve body 3 revolves. Thus, it is possible to reduce the above described shortest distance H1 to the vicinity of the design limit. Accordingly, it is possible to control the flow rate of exhaust gas precisely while the opening degree of the valve body 3 is in the range of from zero degree to α degree described above.

However, in a case where the depth d' of the recessed portion 312' is configured to satisfy a relationship H1'>d' like the comparative example shown in FIG. 8B, the shortest distance H1' is too great, and it is not possible to control the flow rate of exhaust gas precisely.

Figure 9A:
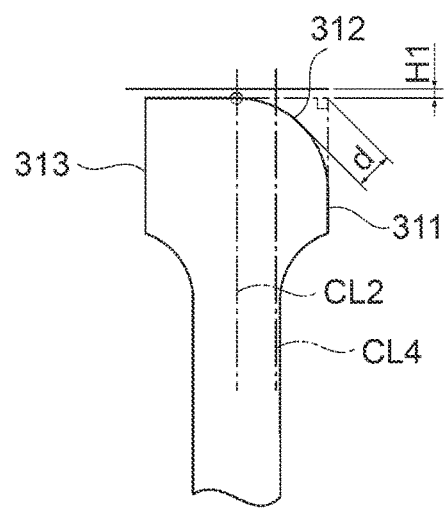
FIGS. 9A to 9C are each an enlarged view of an outer peripheral portion of a valve body according to some embodiments.
Figure 9B:
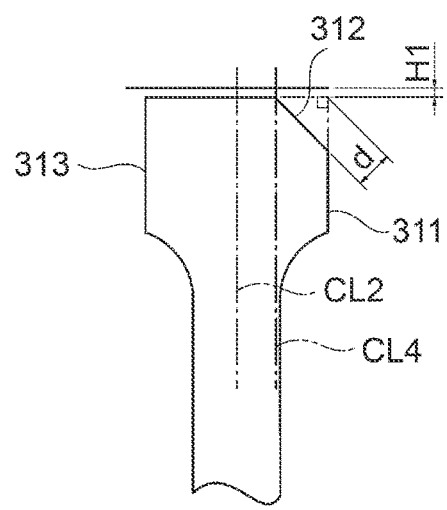
Figure 9C:
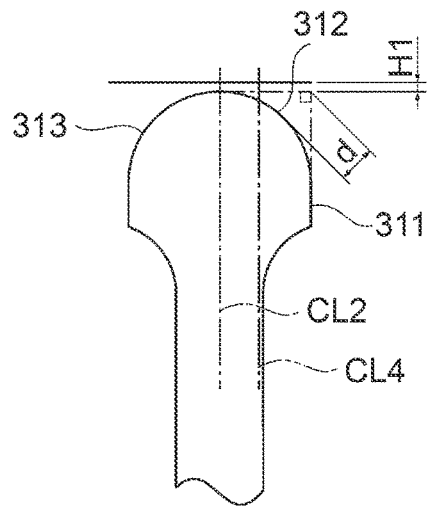

FIGS. 9A to 9C are each an enlarged view of an outer peripheral portion of a valve body according to some embodiments.

In some embodiments, as shown in FIGS. 2, 3, 5, 9A, and 9B, the above described recessed portion 312 has an R shape formed on the outer peripheral portion 31.

According to this embodiment, exhaust gas passing through the passage region R in the valve-open state flows smoothly along the R shape, and thus it is possible to reduce pressure loss of exhaust gas.

In some embodiments, as shown in FIG. 9B, the above described recessed portion 312 has a flat shape formed on the outer peripheral portion 31.

According to this embodiment, the recessed portion 312 has a flat shape formed on the outer peripheral portion 31. Such a flat shape can be formed easily by cutting a corner portion of the outer peripheral portion 31 of the valve body 3, for instance, and thus has a high workability.

In the embodiments shown in FIGS. 9A and 9C, the recessed portion 312 is formed from the center axis CL2 to the seat surface 311 in the thickness direction of the valve body 3. However, the present invention is not limited to this. As shown in FIG. 9B, the recessed portion 312 may be formed from the rotational center line CL4 passing through the rotational center O of the valve body 3 to the seat surface 311, without particular limitation.

In some embodiments, as shown in FIG. 5, when the above described valve body 3 transitions from the fully-closed state to the valve-open state, provided that the first side is a side where the outer peripheral portion 31 of the valve body 3 rotates toward the downstream side of the exhaust flow passage and the second side is a side where the outer peripheral portion 31 of the valve body 3 rotates toward the upstream side of the exhaust flow passage, the outer peripheral portion 31 of the valve body 3 (3B) disposed on the second side has an R shape on a side surface 313 opposite to the seat surface 311 across the center axis CL2 in the thickness direction of the valve body 3.

In the valve body 3 (3B) disposed on the second side, the seat surface 311 of the outer peripheral portion 31 is facing downstream, while the opposite side to the seat surface 311 of the outer peripheral portion 31 is facing upstream. Thus, according to this embodiment, the side surface 313 opposite to the seat surface 311 of the outer peripheral portion 31 has an R shape, and thereby exhaust gas flowing toward the passage region R from upstream in the valve-open state flows smoothly along the R shape, which makes it possible to reduce pressure loss of exhaust gas.

Figure 2:
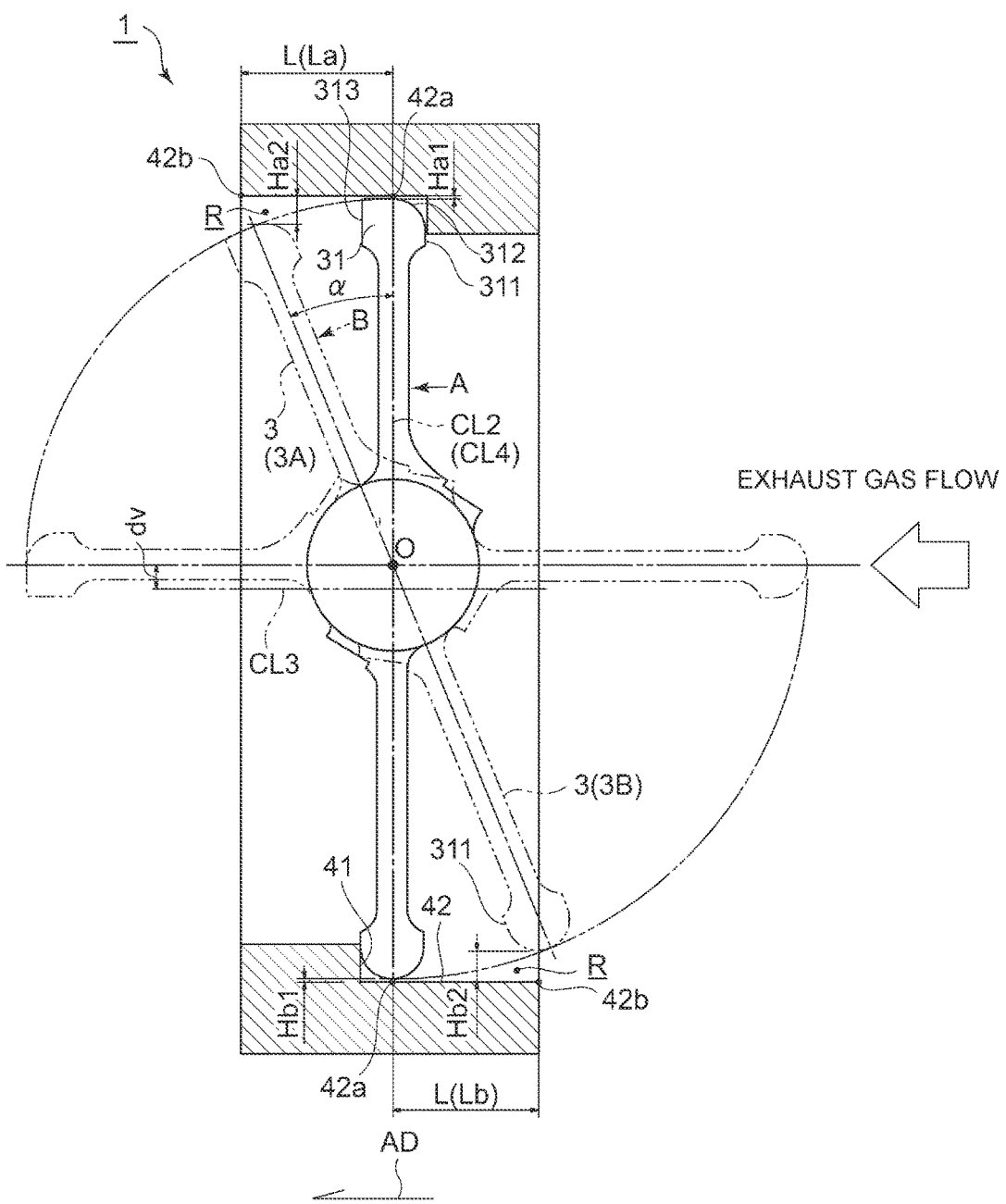
FIG. 2 is a cross-sectional view of an exhaust-flow-rate control valve according to an embodiment of the present invention, as seen in a direction perpendicular to the axis.
Figure 3:
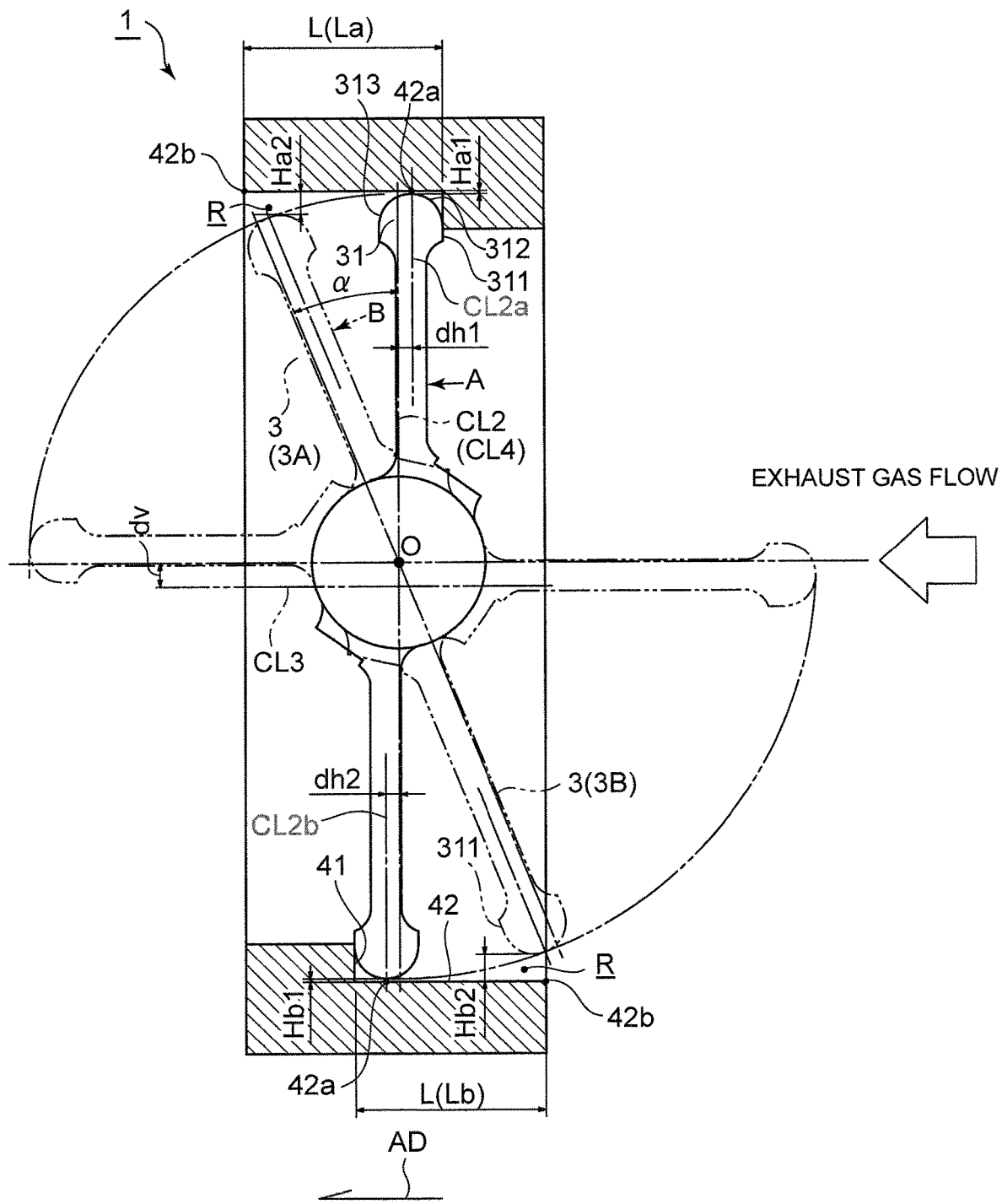
FIG. 3 is a cross-sectional view of an exhaust-flow-rate control valve according to an embodiment of the present invention, as seen in a direction perpendicular to the axis.

In some embodiments, as shown in FIGS. 2 and 3, the above described flow passage surface 42 includes a parallel surface parallel to the axial direction AD of the exhaust flow passage, from the predetermined position 42a at which the distance from the valve body 3 is the shortest distance H1 when the valve body 3 is in the fully-closed state to the end portion 42b, in a cross-sectional view in a direction perpendicular to the center axis CL1 of the valve rod 2.

According to this embodiment, the flow passage surface 42 includes a parallel surface parallel to the axial direction AD of the exhaust flow passage. Thus, there is no need to perform any special machining on the flow passage surface 42, and the valve housing 4 has a high workability.

Figure 4:
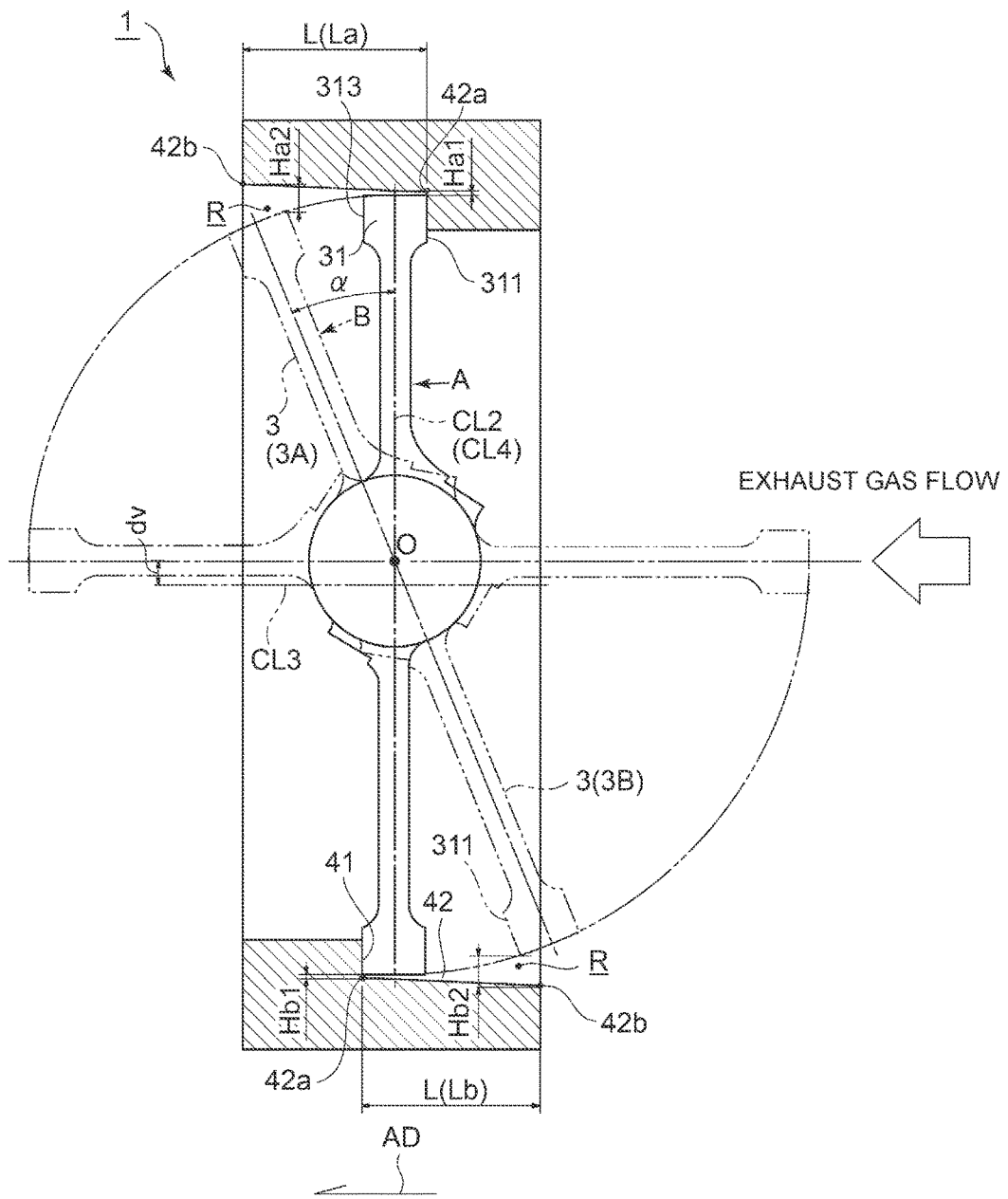
FIG. 4 is a cross-sectional view of an exhaust-flow-rate control valve according to an embodiment of the present invention, as seen in a direction perpendicular to the axis.

In some embodiments, as shown in FIG. 4, the above described flow-passage surface 42 includes an inclined surface inclined from the axial direction AD of the exhaust flow passage, extending outwardly and linearly toward the end portion 42b from the predetermined position 42a at which the distance from the valve body 3 is the shortest distance H1 when the valve body 3 is in the fully-closed state, in a cross-sectional view in a direction perpendicular to the center axis CL1 of the valve rod 2.

According to this embodiment, when the valve 3 revolves, it is possible to reliably prevent contact between the outer peripheral portion 31 of the valve body 3 and the flow passage surface 42. Accordingly, as shown in FIG. 4, it is possible to reduce the above described shortest distance H1 to near the design limit even if the above described recessed portion 312 is not formed on the outer peripheral portion 31 of the valve body 3, and thereby it is possible to control the flow rate of exhaust gas precisely while the opening degree of the valve body 3 is in the range of from zero degree to α degree described above.

In some embodiments, as shown in FIG. 5, the above described flow-passage surface 42 includes a curved surface curved inward toward the end portion 42b from the predetermined position 42a at which the distance from the valve body 3 is the shortest distance H1 when the valve body 3 is in the fully-closed state, in a cross-sectional view in a direction perpendicular to the center axis CL1 of the valve rod 2.

According to this embodiment, when the valve body 3 revolves, compared to the embodiments shown in FIGS. 2 to 4, the shortest distance H between the outer peripheral portion 31 of the valve body 3 and the flow passage surface 42 can be reduced over the range where the opening degree of the valve body 3 is from zero degree to the above described α degree. Accordingly, it is possible to control the flow rate of exhaust gas precisely while the opening degree of the valve body 3 is in the range of from zero degree to α degree described above.

In some embodiments, as shown in FIG. 5, the above described flow passage surface 42 is configured such that the shortest distance H between the valve body 3 and the flow passage surface 42 is maintained at a constant distance while the valve body 3 transitions from the fully-closed state to a predetermined valve-open state.

As described above, even if the shortest distance H between the valve body 3 and the flow-passage surface 42 is maintained at a constant distance, the flow rate of exhaust gas passing through the passage region R increases with an increase in the engine rotation speed. Accordingly, with the above embodiment, it is possible to control the flow rate of exhaust gas very precisely while the opening degree of the valve body 3 is in the range of from zero degree to α degree described above.

In some embodiments, as shown in FIGS. 2 to 5, in the above described cross-sectional view taken along a direction perpendicular to the center axis CL1 of the valve rod 2, the rotational center O of the valve body 3 is eccentric with respect to the center line CL3 in the height direction of the valve body 3.

According to this embodiment, it is possible to improve the sealing performance and to improve the valve controllability when the valve body 3 opens, by setting the eccentric position and the eccentric amount of the valve body 3 appropriately.

In some embodiments, as shown in FIGS. 2 to 5, when the valve body 3 transitions from the fully-closed state to the valve-open state, provided that the first side is a side where the outer peripheral portion 31 of the valve body 3 rotates toward the downstream side of the exhaust flow passage and the second side is a side where the outer peripheral portion of the valve body rotates toward the upstream side of the exhaust flow passage, the rotational center O of the valve body 3 is positioned closer to the first side than the center line CL3 in the height direction of the valve body 3.

In the shown embodiment, the rotational center O is disposed away from the center line CL3 toward the first side by the distance dv.

According to this embodiment, a rotational moment in a direction to push the valve body 3 against the valve seat surface 41 is applied to the valve body 3. Thus, the airtightness in the fully-closed state improves, which makes it possible to improve the sealing performance of the valve body 3. Furthermore, even in this embodiment, the valve body 3 can be opened and closed with a small output of an actuator, compared to a typical flap type exhaust-flow-rate control valve.

In some embodiments, as shown in FIG. 3, when the valve body 3 transitions from the fully-closed state to the valve-open state, provided that the first side is a side where the outer peripheral portion 31 of the valve body 3 rotates toward the downstream side of the exhaust flow passage and the second side is a side where the outer peripheral portion 31 of the valve body 3 rotates toward the upstream side of the exhaust flow passage, in a cross-sectional view in a direction perpendicular to the center axis CL1 of the valve rod 2, the rotational center O is disposed closer to the downstream side of the exhaust flow passage than the center line CL2a in the thickness direction of the valve body 3 (3A) of the first side, and closer to the upstream side of the exhaust flow passage than the center line CL2b in the thickness direction of the valve body 3 (3B) of the second side.

In the depicted embodiment, the rotational center O is disposed downstream by dh1 from the center line CL2a in the thickness direction of the valve body 3 (3A) of the first side, and upstream by dh2 from the center axis CL2b in the thickness direction of the valve body 3 (3B) of the second side.

According to this embodiment, the rotational center O of the valve body 3 is eccentric toward the downstream side with respect to the center line CL2a in the thickness direction of the valve body 3 (3A) of the first side, and thereby it is possible to reliably cause the valve body 3 (3A) of the first side to make contact with the valve seat surface 41 without being affected by a production tolerance or the like, as compared to a case in which the rotational center O of the valve body 3 is not eccentric to the downstream side. Furthermore, the rotational center O of the valve body 3 is eccentric toward the upstream side with respect to the center line CL2b in the thickness direction of the valve body 3 (3B) of the second side, and thereby it is possible to reliably cause the valve body 3 (3B) of the second side to make contact with the valve seat surface 41 without being affected by a production tolerance or the like, as compared to a case in which the rotational center O of the valve body 3 is not eccentric to the upstream side.

Figure 10:
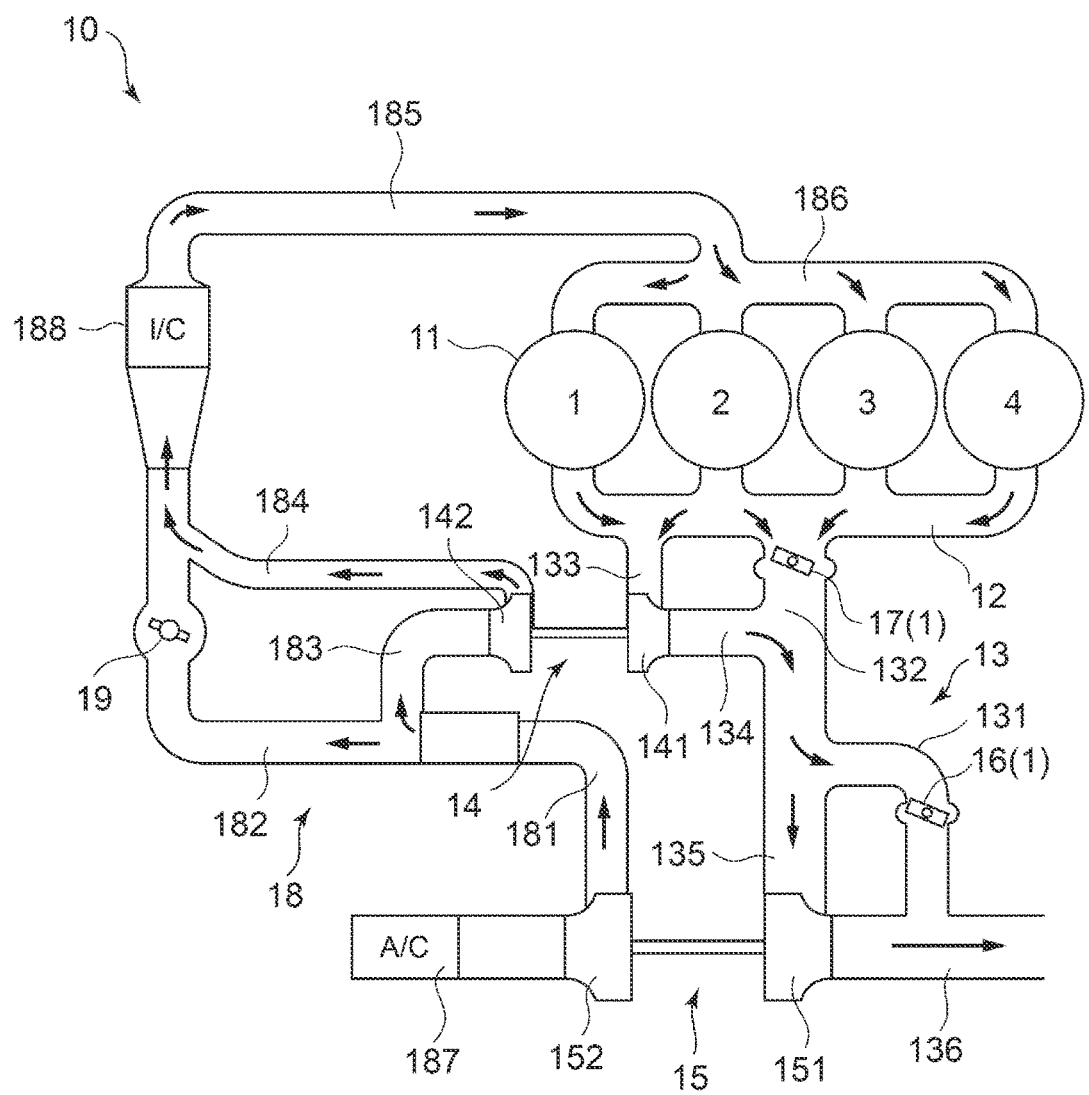
FIG. 10 is a block configuration diagram of a two-stage supercharging system according to an embodiment of the present invention.

FIG. 10 is a block configuration diagram of a two-stage supercharging system according to an embodiment of the present invention.

As shown in FIG. 10, a two-stage supercharging system 10 according to an embodiment of the present invention is provided with: an engine 11; an exhaust manifold 12 into which exhaust gas discharged from the engine 11 is introduced; an exhaust system 13 through which exhaust gas discharged from the exhaust manifold 12 flows; a high-pressure stage supercharger 14 having a high-pressure stage turbine 141 configured to be driven by exhaust gas discharged from the exhaust manifold 12; a low-pressure stage supercharger 15 having a low-pressure stage turbine 151 disposed downstream of the high-pressure stage supercharger 14 in the exhaust system 13 and configured to be driven by exhaust gas discharged from the high-pressure stage supercharger 14; and the exhaust-flow-rate control valve 1 according to the above embodiment.

Furthermore, the above described exhaust system 13 includes a high-pressure side bypass flow passage 132 connecting the exhaust manifold 12 and the downstream side of the high-pressure stage turbine 141, bypassing the high-pressure stage turbine 141. The above described exhaust-flow-rate control valve 1 is configured as a high-pressure stage turbine bypass valve (exhaust flow control valve) 17 for controlling the flow rate of exhaust gas flowing through the high-pressure side bypass flow passage 132.

According to this embodiment, it is possible to provide the two-stage supercharging system 10 with the high-pressure stage turbine bypass valve 17 comprising the exhaust-flow-rate control valve 1 according to the above embodiment, configured to control the flow rate of exhaust gas supplied to the high-pressure stage turbine 141.

As shown in FIG. 10, a two-stage supercharging system 10 according to an embodiment of the present invention is provided with: an engine 11; an exhaust manifold 12 into which exhaust gas discharged from the engine 11 is introduced; an exhaust system 13 through which exhaust gas discharged from the exhaust manifold 12 flows; a high-pressure stage supercharger 14 having a high-pressure stage turbine 141 configured to be driven by exhaust gas discharged from the exhaust manifold 12; a low-pressure stage supercharger 15 having a low-pressure stage turbine 151 disposed downstream of the high-pressure stage supercharger 14 in the exhaust system 13 and configured to be driven by exhaust gas discharged from the high-pressure stage supercharger 14; and the exhaust-flow-rate control valve 1 according to the above embodiment.

Furthermore, the above described exhaust system 13 includes a low-pressure side bypass flow passage 131 connecting the downstream side of the high-pressure stage turbine 141 and the downstream side of the low-pressure stage turbine 151, bypassing the low-pressure stage turbine 151. The above described exhaust-flow-rate control valve 1 is configured as a low-pressure stage turbine bypass valve (waste-gate valve) 16 for controlling the flow rate of exhaust gas flowing through the low-pressure side bypass flow passage 131.

According to this embodiment, it is possible to provide a two-stage supercharging system 10 with the low-pressure stage turbine bypass valve 16 comprising the exhaust-flow-rate control valve 1 according to the above embodiment, configured to control the flow rate of exhaust gas supplied to the low-pressure stage turbine 151.

In the depicted embodiment, the high-pressure stage supercharger 14 includes a high-pressure stage compressor 142 coaxially driven by the high-pressure stage turbine 141. The low-pressure stage supercharger 15 includes a low-pressure stage compressor 152 coaxially driven by the low-pressure stage turbine 151. Exhaust gas discharged from the engine 11 is collected in the exhaust manifold 12, and is supplied to the high-pressure stage turbine 141 via the exhaust flow passage 133. Exhaust gas supplied to the high-pressure stage turbine 141 is discharged to the exhaust flow passage 135 via the exhaust flow passage 134 connected to the downstream side of the high-pressure stage turbine 141. Exhaust gas discharged from the exhaust flow passage 135 is supplied to the low-pressure stage turbine 151. Exhaust gas supplied to the low-pressure stage turbine 151 is discharged to the exhaust flow passage 136 connected to the downstream side of the low-pressure stage turbine 151.

Further, the exhaust manifold 12 and the exhaust flow passage 135 are connected via the above described high-pressure side bypass flow passage 132. The exhaust flow passage 135 and the exhaust flow passage 136 are connected via the above described low-pressure side bypass flow passage 131. Further, the above described low-pressure stage turbine bypass valve 16 is disposed in the low-pressure side bypass flow passage 131. Further, the above described high-pressure stage turbine bypass valve 17 is disposed in the high-pressure side bypass flow passage 132.

If the low-pressure stage turbine bypass valve 16 is in the valve-open state, most of exhaust gas flowing through the exhaust flow passage 134 bypasses the low-pressure stage turbine 151 and flows into the low-pressure side bypass flow passage 131. If the low-pressure stage turbine bypass valve 16 is in the fully-closed state, exhaust gas flowing through the exhaust flow passage 134 flows through the exhaust flow passage 135 to be supplied to the low-pressure stage turbine 151. The flow rate of exhaust gas flowing through the low-pressure stage bypass flow passage 131 can be controlled through the opening degree of the low-pressure stage turbine bypass valve 16.

Similarly, if the high-pressure stage turbine bypass valve 17 is in the valve-open state, most of exhaust gas collected in the exhaust manifold 12 bypasses the high-pressure stage turbine 141 and flows into the high-pressure side bypass flow passage 132. If the high-pressure stage turbine bypass valve 17 is in the fully-closed state, exhaust gas collected in the exhaust manifold 12 flows through the exhaust flow passage 133 to be supplied to the high-pressure stage turbine 141. The flow rate of exhaust gas flowing through the second bypass flow passage 132 can be controlled through the opening degree of the high-pressure stage turbine bypass valve 17.

In FIG. 10, the reference numeral 18 is an intake system including intake flow passages 181 to 185 and an intake manifold 186. The low-pressure stage compressor 152 pressurizes intake air supplied from an air cooler 187, and supplies the intake air to the high-pressure stage compressor 142 via the intake flow passages 181, 183. Further, a compressor bypass valve 19 is disposed in the intake flow passage 182 bypassing the high-pressure stage compressor 142, to control the intake flow rate in the intake flow passage 182. Intake air pressurized by the high-pressure stage compressor 142, or intake air bypassing the high-pressure stage compressor 142 and flowing through the intake flow passage 182 is supplied to the intake manifold 186 via the intake flow passage 185. Further, an inter cooler 188 is disposed in the intake flow passage 185.

Figure 11:
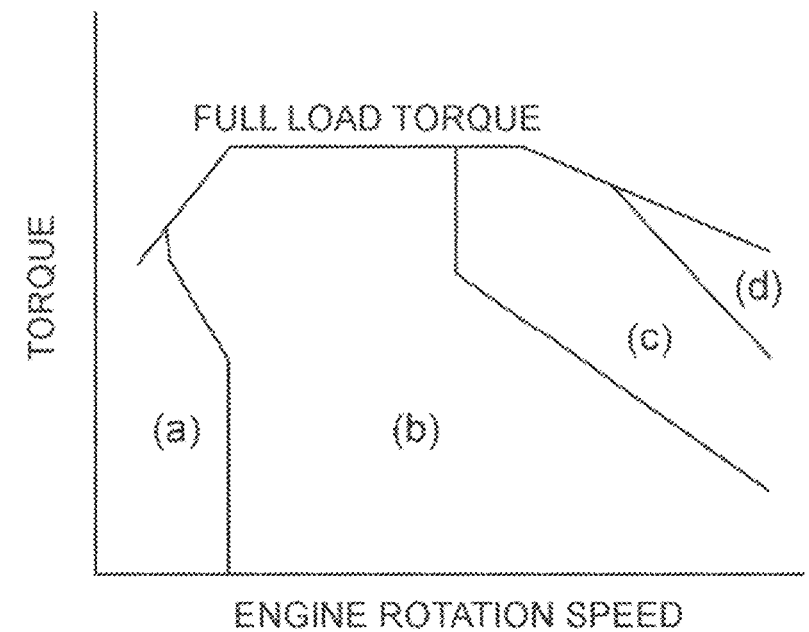
FIG. 11 is a chart showing a relationship between engine rotation speed and engine torque of a two-stage supercharging system according to an embodiment of the present invention.

FIG. 11 is a chart showing a relationship between engine rotation speed and engine torque of a two-stage supercharging system according to an embodiment of the present invention. In the range (a) shown in FIG. 11, performing two-stage supercharging (full two-stage supercharging) where both of the high-pressure stage supercharger 14 and the low-pressure stage supercharger 15 are driven is advantageous in terms of improvement of the low-speed torque and the transient property of the engine. Thus, each of the high-pressure stage turbine bypass valve 17 and the low-pressure stage turbine bypass valve 16 is controlled to be in the fully-closed state. In the range (b) shown in FIG. 11, variable two-stage supercharging is performed, in which the low-pressure stage supercharger 15 is driven and driving of the high-pressure stage supercharger 14 is controlled by controlling the flow rate of exhaust gas supplied to the high-pressure stage supercharger 14. In the variable two-stage supercharging, the low-pressure stage turbine bypass valve 16 is in the fully-closed state, and the opening degree of the high-pressure stage turbine bypass valve 17 is adjusted, and thereby the flow rate of exhaust gas supplied to the high-pressure stage supercharger 14 is changed in accordance with the target output of the engine 11.

Furthermore, in the range (c) shown in FIG. 11, the engine rotation speed is high and thus performing one-stage supercharging with the low-pressure stage supercharger 15 while bypassing exhaust gas from the high-pressure stage supercharger 14 makes it possible reduce a back pressure of the engine compared to the two-stage supercharging, thereby realizing stable operation with flexible matching. Thus, the high-pressure stage turbine bypass valve 17 is controlled to be in the fully-open state, and the low-pressure stage turbine bypass valve 16 is controlled to be in the fully-closed state. Furthermore, in the high-speed operational range of the engine 11, if there is a risk of overboost of the engine 11 (range (d) shown in FIG. 11), the high-pressure stage turbine bypass valve 17 is controlled to be in the fully-open state and a control is performed to adjust the opening degree of the low-pressure stage turbine bypass valve 16, thereby reducing the flow rate of exhaust gas supplied to the low-pressure stage supercharger 15.

Accordingly, with the two-stage supercharging system 10 according to an embodiment of the present invention, at least one of the high-pressure stage turbine bypass valve 17 or the low-pressure stage turbine bypass valve 16 comprises the exhaust-flow-rate control valve 1 according to the above embodiment, and thereby it is possible to control the flow rate of exhaust gas precisely in the ranges (b) and (d) shown in FIG. 11.

Figure 12:
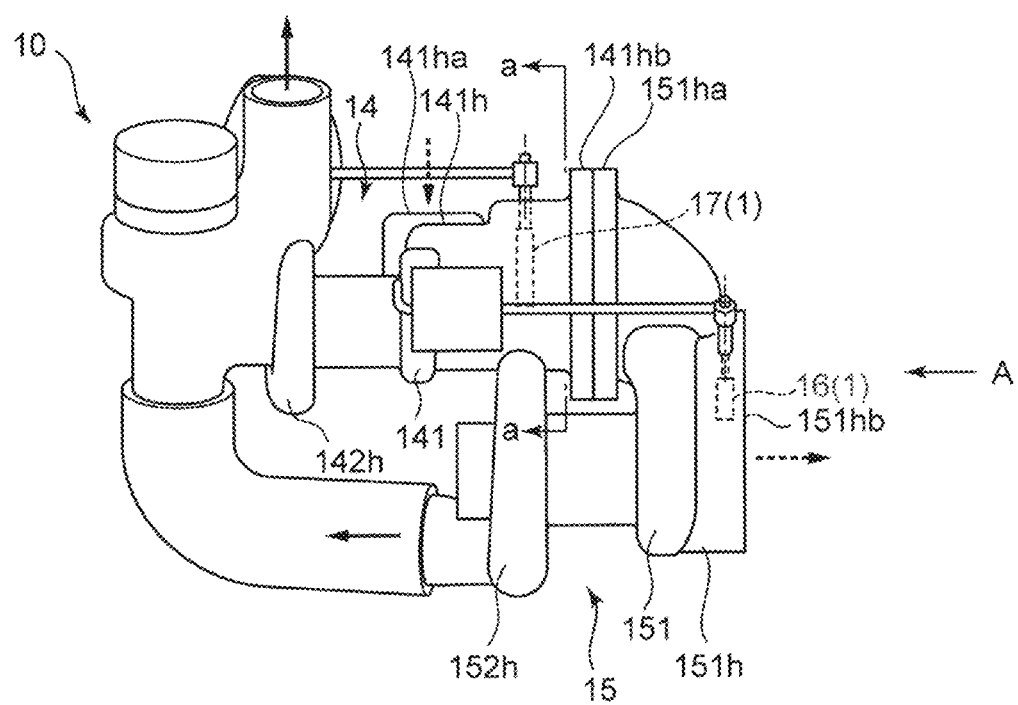
FIG. 12 is a front view of a two-stage supercharging system according to an embodiment of the present invention.
Figure 13:
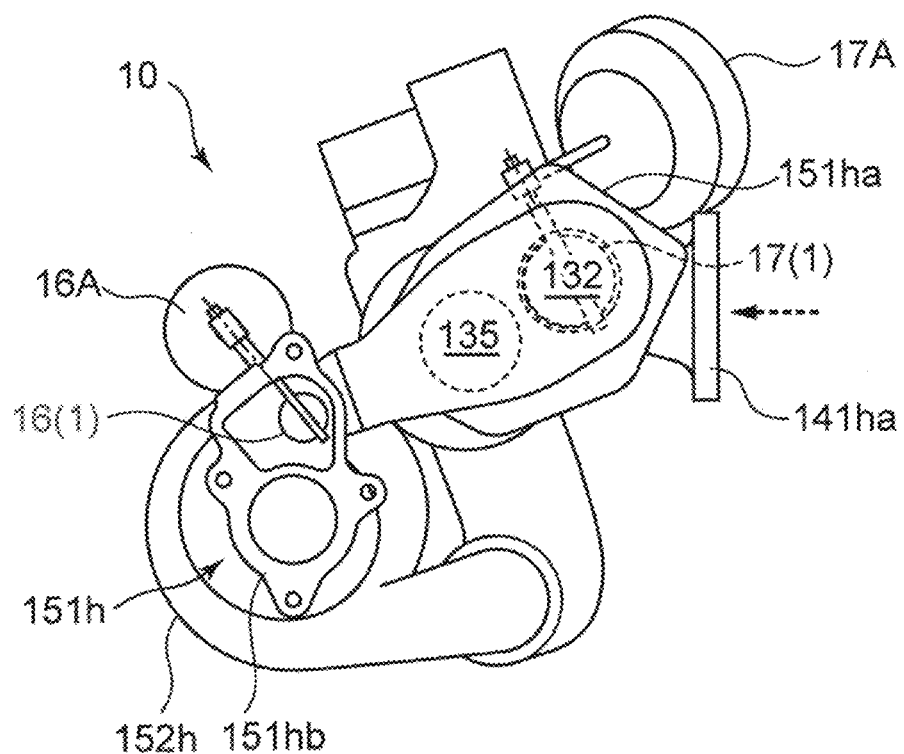
FIG. 13 is a view in the direction of arrow A, taken from FIG. 12.
Figure 14:
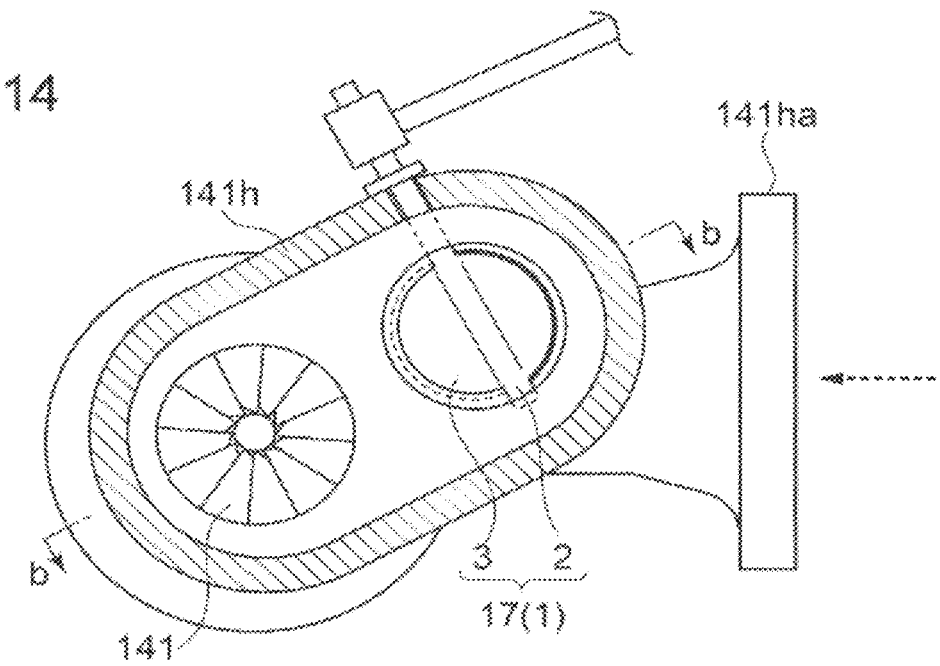
FIG. 14 is a cross-sectional view taken along line a-a in FIG. 12.
Figure 15:
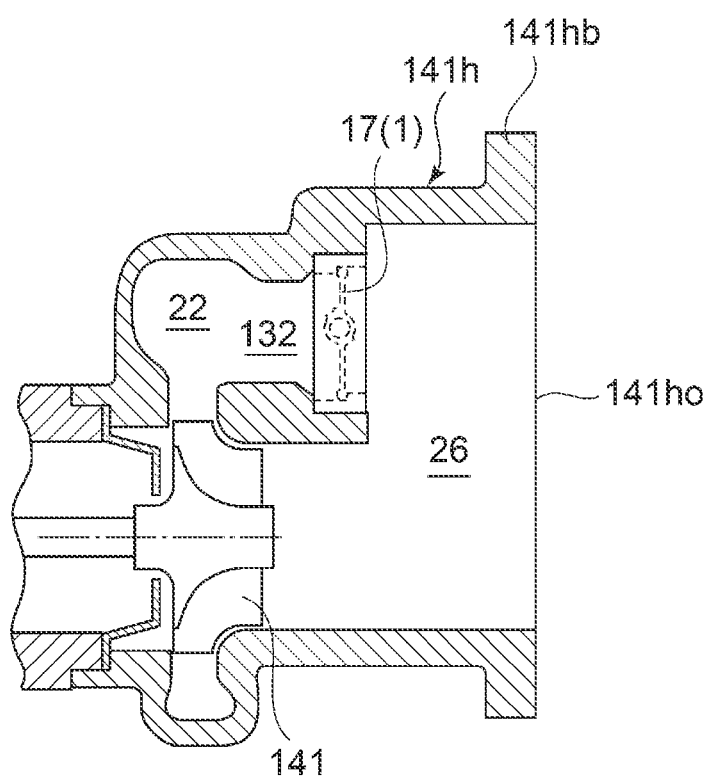
FIG. 15 is a cross-sectional view taken along line b-b in FIG. 14.

FIG. 12 is a front view of a two-stage supercharging system according to an embodiment of the present invention. FIG. 13 is a view in the direction of arrow A, taken from FIG. 12. FIG. 14 is a cross-sectional view taken along line a-a in FIG. 12. FIG. 15 is a cross-sectional view taken along line b-b in FIG. 14.

As shown in FIGS. 12 to 15, the turbine supercharger according to an embodiment of the present invention is the high-pressure stage supercharger 14 in the two-stage supercharging system 10, including a high-pressure stage turbine 141, a high-pressure stage turbine housing 141h housing the high-pressure stage turbine 141, and a high-pressure stage turbine bypass valve 17 for controlling the flow rate of exhaust gas supplied to the high-pressure stage turbine 141.

As shown in FIG. 15, inside the high-pressure stage turbine housing 141h, a scroll flow passage 22 for guiding exhaust gas to the high-pressure stage turbine 141 and an outlet flow passage 26 for discharging exhaust gas supplied to the high-pressure stage turbine 141 outside the high-pressure stage turbine housing 141h are formed. Specifically, the scroll flow passage 22 is disposed upstream of the high-pressure stage turbine 141, and the outlet flow passage 26 is disposed downstream of the high-pressure stage turbine 141. Even further, inside the high-pressure stage turbine housing 141h, a low-pressure side bypass flow passage 132 is formed, bypassing the high-pressure stage turbine 141 and connecting the scroll flow passage 22 and the outlet flow passage 26.

FIG. 16 is an enlarged cross-sectional view of a turbine bypass valve disposed inside the turbine housing. As shown in FIG. 16, the high-pressure stage turbine bypass valve 17 includes the valve rod 2, the valve body 3 of a flat plate shape revolvable about the valve rod 2, and the valve housing 4 of a cylindrical shape defining a part of the high-pressure side bypass flow passage 132 inside thereof, the valve housing 4 including the valve seat surface 41 to make contact with the outer peripheral portion 31 of the valve body 3 when the valve body 3 is in the fully-closed state in which the opening degree of the valve body 3 is zero degree, extending in a direction that intersects with the axial direction AD of the high-pressure side bypass flow passage 132, and the flow passage surface 42 defining the passage region R through which exhaust gas passes between the flow passage surface 42 and the outer peripheral portion 31 of the valve body 3 in the valve-open state in which the opening degree of the valve body 3 is greater than zero degree, extending along the axial direction AD of the high-pressure side bypass flow passage 132, formed on the inner peripheral surface of the valve housing 4. Further, in the high-pressure stage supercharger 14 according to an embodiment of the present invention, the valve housing 4 is fixed to the inner peripheral wall surface 141hs of the high-pressure side bypass flow passage 132, inside the high-pressure stage turbine housing 141h.

In the embodiment shown in FIG. 16, the high-pressure stage turbine bypass valve 17 has a configuration similar to that of the exhaust-flow-rate control valve 1 according to the embodiment shown in FIG. 3 described above. However, the high-pressure stage turbine bypass valve 17 according to an embodiment of the present invention is not limited to this, and may have a configuration similar to an embodiment shown in FIGS. 2, 4, and 5 described above.

According to this embodiment, the high-pressure stage turbine bypass valve 17 is configured as a butterfly-type turbine bypass valve. Thus, compared to a typical flap-type high-pressure stage turbine bypass valve, the valve body 3 can be opened and closed with a small output, and thus it is possible to reduce the size of the high-pressure stage actuator 17A.

Furthermore, according to this embodiment, the high-pressure side bypass flow passage 132 bypassing the high-pressure stage turbine 141 is formed inside the high-pressure stage turbine housing 141h, and the high-pressure stage turbine bypass valve 17 is disposed inside the high-pressure stage turbine housing 141h. Thus, compared to a case in which the high-pressure side bypass flow passage 132 is formed outside the high-pressure stage turbine housing 141h and the high-pressure stage turbine bypass valve 17 is disposed outside the high-pressure stage turbine housing 141h, it is possible to reduce the size of the high-pressure stage supercharger 14.

In FIGS. 12 to 15, the reference sign 141ha indicates an inlet flange portion of the high-pressure stage turbine housing 141h, and the reference sign 141hb indicates an outlet flange portion of the high-pressure stage turbine housing 141h. Similarly, the reference sign 151ha indicates an inlet flange portion of the low-pressure stage turbine housing 151h, and the reference sign 151hb indicates an outlet flange portion of the low-pressure stage turbine housing 151h. The reference sign 142h is a high-pressure stage compressor housing that houses the high-pressure stage compressor 142, and the reference sign 152h is a low-pressure stage compressor housing that houses the low-pressure stage compressor 152. Further, the reference sign 16A is a low-pressure stage actuator for opening and closing the low-pressure stage turbine bypass valve 16.

In FIGS. 14 to 16, the high-pressure stage turbine bypass valve 17 (exhaust-flow-rate control valve 1) is disposed inside the turbine housing 14h of the high-pressure stage supercharger 14 in the two-stage supercharging system 10. A similar explanation basically applies to a case in which the low-pressure stage turbine bypass valve 16 (exhaust-flow-rate control valve 1) is disposed inside the turbine housing 15h of the low-pressure stage supercharger 15. Specifically, the turbine supercharger according to an embodiment of the present invention may be the low-pressure stage supercharger 15 in the two-stage supercharging system 10, including a low-pressure stage turbine 151, a low-pressure stage turbine housing 151h housing the low-pressure stage turbine 151, and a low-pressure stage turbine bypass valve 16 for controlling the flow rate of exhaust gas supplied to the low-pressure stage turbine 151. Further, the turbine supercharger according to an embodiment of the present invention may be a turbine supercharger for a one-stage supercharging system equipped with a single turbocharger, besides a turbine supercharger for the two-stage supercharging system 10.

In some embodiments, in the high-pressure stage supercharger 14 (turbine supercharger) according to the above described embodiment, as shown in FIG. 16, the above described valve housing 4 includes a seating portion 4A of a cylindrical shape having an inner peripheral surface on which the valve seat surface 41 and the flow passage surface 42 are formed integrally. Further, the seating portion 4A is fixed to the inner peripheral wall surface 141hs of the high-pressure side bypass flow passage 132, inside the high-pressure stage turbine housing 141h. The seating portion 4A may be fixed to the inner peripheral wall surface 141hs of the high-pressure side bypass flow passage 132 by various methods including press fit, shrink fit, and cooling fit.

According to this embodiment, the valve housing 4 includes the seating portion 4A of a cylindrical shape having an inner peripheral surface on which the valve seat surface 41 and the flow passage surface 42 are formed integrally. Thus, compared to a case in which the valve housing 4 is formed separately from the valve seat surface 41 and the flow passage surface 42, the assembling performance is improved.

In some embodiments, in the high-pressure stage supercharger 14 (turbine supercharger) according to the above described embodiment, as shown in FIG. 16, a flat surface 141hs1 and a step portion 141hs2 extending inward from the upstream end of the flat surface 141hs1 are formed on the inner peripheral wall surface 141hs of the high-pressure side bypass flow passage 132. When the above described seating portion 4A is fixed to the inner peripheral wall surface 141hs1 of the high-pressure side bypass flow passage 132, an end surface 4Aa of the seating portion 4A is in contact with the step portion 141hs2.

According to this embodiment, to insert the seating portion 4A into the high-pressure stage turbine housing 141h from the opening end 141ho of the outlet flange portion 141hb of the high-pressure stage turbine housing 141h, the seating portion 4A merely needs to be inserted until coming into contact with the step portion 141hs2 formed on the inner peripheral wall surface 141hs1 of the high-pressure side bypass flow passage 132, which makes it easy to determine the position of the seating portion 4A and improves the mounting workability of the seating portion 4A.

In some embodiments, in the high-pressure stage supercharger 14 (turbine supercharger) according to the above described embodiment, as shown in FIG. 16, a width increasing portion 141hs3 that increases the width of the inner cross section from upstream toward downstream is formed on the inner peripheral wall surface 141hs of the above described high-pressure side bypass flow passage 132, at a position upstream of the step portion 141hs2. Further, when the valve body 3 transitions from the fully-closed state to the valve-open state, provided that the first side is a side where the outer peripheral portion 31 of the valve body 3 rotates toward the downstream side of the high-pressure side bypass flow passage 132 (the upper side in FIG. 16) and the second side is a side where the outer peripheral portion 31 of the valve body 3 rotates toward the upstream side of the bypass flow passage 132 (the lower side in FIG. 16), the outer peripheral portion 31 of the valve body 3 disposed on the second side passes through the width-increasing portion 141hs4.

In the depicted embodiment, a tapered surface 141hs4 extending linearly outward from upstream toward downstream is formed on the inner peripheral wall surface 141hs of the high-pressure side bypass flow passage 132, at a position upstream of the step portion 141hs2, thereby forming the width increasing portion 141hs3 increasing the width of the inner cross section. Instead of the tapered surface 141hs4, an arc portion having an arc shape may form the width increasing portion 141hs3, for instance.

According to this embodiment, the width increasing portion 141hs3 increasing the width of the inner cross section from upstream toward downstream is formed on the inner peripheral wall surface 141hs of the high-pressure side bypass flow passage 132, at a position upstream of the step portion 141hs2. Accordingly, it is possible to reduce pressure loss when exhaust gas flows through portions having different sizes in the inner cross section. Further, it is possible to reduce the size of the high-pressure side bypass flow passage 132 through a configuration in which the outer peripheral portion 31 of the valve body 3 disposed on the second side (the lower side in FIG. 16) passes through the width increasing portion 141hs4, thus reducing the overall size of the high-pressure stage turbine housing 141h.

Furthermore, as shown in FIG. 10 described above, the two-stage supercharging system 10 according to at least one embodiment of the present invention is provided with an engine 11, an exhaust manifold 12 into which exhaust gas discharged from the engine 11 is introduced, an exhaust system 13 through which exhaust gas discharged from the exhaust manifold 12 flows, a high-pressure stage supercharger 14 having a high-pressure stage turbine 141 configured to be driven by exhaust gas discharged from the exhaust manifold 13, and a low-pressure stage supercharger 15 having a low-pressure stage turbine 151 disposed downstream of the high-pressure stage supercharger 14 in the exhaust system 13 and configured to be driven by exhaust gas 141 discharged from the high-pressure stage supercharger 14. Further, the high-pressure stage supercharger 14 comprises a turbine supercharger according to an embodiment shown in FIGS. 12 to 16 described above.

According to this embodiment, as shown in FIGS. 12 to 16 described above, the high-pressure side bypass flow passage 132 bypassing the high-pressure stage turbine 141 is formed inside the high-pressure stage turbine housing 141h, and the high-pressure stage turbine bypass valve 17 is disposed inside the high-pressure stage turbine housing 141h. Thus, compared to a case in which the high-pressure side bypass flow passage 132 and the high-pressure stage turbine bypass valve 17 are formed outside the high-pressure stage turbine housing 141h, it is possible to reduce the overall size of the two-stage supercharging system 10.

Furthermore, according to this embodiment, the high-pressure stage turbine bypass valve 17 is disposed inside the high-pressure side bypass flow passage 132. Thus, compared to a typical case in which the high-pressure stage turbine bypass valve 17 is disposed between the exhaust manifold 12 and the high-pressure stage turbine housing 141h, the high-pressure stage turbine bypass valve 17 is disposed downstream, and thus the temperature of exhaust gas passing through the high-pressure stage turbine bypass valve 17 decreases. Thus, compared to a typical case, the high-pressure stage turbine bypass valve 17 is less likely to be affected by thermal deformation, and has an improved reliability. Further, compared to a typical case, the high-pressure stage turbine bypass valve 17 can be composed of less thermally-resistant and less expensive materials.

In some embodiments, in the two-stage supercharging system 10 shown in FIG. 10, the low-pressure stage supercharger 15 has a configuration similar to the turbine supercharger according to an embodiment shown in FIGS. 12 to 16.

That is, as shown in FIGS. 12 and 13, the low-pressure stage supercharger 15 is provided with a low-pressure stage turbine 151, a low-pressure stage turbine housing 151h housing the low-pressure stage turbine 151, and a low-pressure stage turbine bypass valve 16 for controlling the flow rate of exhaust gas supplied to the low-pressure stage turbine 151. Inside the low-pressure stage turbine housing 151h, similarly to the high-pressure stage turbine housing 141h shown in FIG. 15, a scroll flow passage 22 for guiding exhaust gas to the low-pressure stage turbine 151, an outlet flow passage 26 for discharging exhaust gas supplied to the low-pressure stage turbine 151 outside the low-pressure stage turbine housing 151h, and a low-pressure side bypass flow passage 131 bypassing the low-pressure stage turbine 151 and connecting the scroll flow passage 22 and the outlet flow passage 26 are formed.

Furthermore, similarly to the high-pressure stage turbine bypass valve 17 shown in FIG. 16, the low-pressure stage turbine bypass valve 16 includes the valve rod 2, the valve body 3 of a flat plate shape revolvable about the valve rod 2, and the valve housing 4 of a cylindrical shape defining a part of the low-pressure side bypass flow passage 131 inside thereof, the valve housing 4 including the valve seat surface 41 to make contact with the outer peripheral portion 31 of the valve body 3 in the fully-closed state in which the opening degree of the valve body 3 is zero degree, extending in a direction that intersects with the axial direction AD of the low-pressure side bypass flow passage 131, and the flow passage surface 42 defining the passage region R through which exhaust gas passes between the flow passage surface 42 and the outer peripheral portion 31 of the valve body 3 in the valve-open state in which the opening degree of the valve body 3 is greater than zero degree, extending along the axial direction AD of the low-pressure side bypass flow passage 131, formed on the inner peripheral surface of the valve housing 4. Further, the above described valve housing 4 is fixed to the inner peripheral wall surface 141hs of the low-pressure side bypass flow passage 131, inside the low-pressure stage turbine housing 151h.

According to this embodiment, both of the high-pressure stage supercharger 14 and the low-pressure stage supercharger 15 comprise a turbine supercharger as described above, including a turbine bypass valve disposed inside the turbine housing. Thus, compared to a case in which the high-pressure side bypass flow passage 132, the low-pressure side bypass flow passage 131, the high-pressure stage turbine bypass valve 17, and the low-pressure pressure stage turbine bypass valve 16 are formed outside the high-pressure stage turbine housing 141h and the low-pressure stage turbine housing 151h, it is possible to reduce the overall size of the two-stage supercharging system 10.

The embodiments of the present invention have been described above. However, the present invention is not limited thereto, and various modifications may be applied as long as they do not depart from the object of the present invention.

DESCRIPTION OF REFERENCE NUMERALS

1 Exhaust-flow-rate control valve
2 Valve rod
3 Valve body
31 Outer peripheral portion
311 Seat surface
312 Recessed portion
313 Side surface
4 Valve housing
41 Valve seat surface
42 Flow-passage surface
42a Predetermined position
42b End portion
4A Seating portion
4Aa End surface
4B Body portion
4Ba Bolt hole
4Bb Bypass opening
4Bc Bypass flow-passage opening
10 Supercharging system
11 Engine
12 Exhaust manifold 13 Exhaust system
131 Low-pressure side bypass flow passage
132 Second bypass flow passage
133 to 136 Exhaust flow passage
14 High-pressure stage supercharger
141 High-pressure stage turbine
141*h* High-pressure stage turbine housing
141*ha* Inlet flange portion
141*hb* Outlet flange portion
141*ho* Opening end
141*hs* Inner peripheral wall surface
141*hs*1 Flat surface
141*hs*2 Step portion
141*hs*3 Width-increasing portion
141*hs*4 Tapered surface
142 High-pressure stage compressor
142*h* High-pressure stage compressor housing
15 Low-pressure stage supercharger
151 Low-pressure stage turbine
151*h* Low-pressure stage turbine housing
151*ha* Inlet flange portion
151*hb* Outlet flange portion
151*ho* Opening end
151*hs* Inner peripheral wall surface
151*hs*1 Flat surface
151*hs*2 Step portion
151*hs*3 Width-increasing portion
151*hs*4 Tapered surface
152 Low-pressure stage compressor
152*h* Low-pressure stage compressor housing
16 Low-pressure stage turbine bypass valve (waste-gate valve)
16A Low-pressure stage actuator
17 High-pressure stage turbine bypass valve (Exhaust flow control valve)
17A High-pressure stage actuator
18 Intake system
181 to 185 Intake flow passage
186 Intake manifold
187 Air cooler
188 Inter cooler
19 Compressor bypass valve
R Passage region

The invention claimed is:
1. A turbine supercharger, comprising:
a turbine;
a turbine housing which houses the turbine; and
a turbine bypass valve for controlling a flow rate of exhaust gas to be supplied to the turbine,
wherein the turbine housing includes, inside the turbine housing:
 a scroll flow passage for guiding the exhaust gas to the turbine;
 an outlet flow passage for discharging the exhaust gas supplied to the rbine to outside of the turbine housing; and
 a bypass flow passage bypassing the turbine and connectinghe scroll flow passage and the outlet flow passage,
wherein the turbine bypass valve comprises
 a valve rod;
 a valve body having a flat plate shape and being configured to revolve about the valve rod; and
 a valve housing having a cylindrical shape and defining a part of the bypass flow passage inside the valve housing, the valve housing including:
  a valve seat surface being formed on an peripheral surface of the valve housing, extending along a direction intersecting with an axial direction of the bypass flow passage, and being configured to make contact with an outer peripheral portion of the valve body in a fully-closed state in which an opening degree of the valve body is zero degree, the valve seat surface including an upstream valve seat surface being oriented upstream in a flow direction of the exhaust gas and a downstream valve seat, surface being oriented downstream in the flow direction of the exhaust gas; and
  a flow passage surface being formed on the inner peripheral surface of the valve housing, extending along the axial direction of the bypass, flow passage, and defining a passage region through which the exhaust gas passes between the flow passage surface and the outer peripheral portion of the valve body in a valve-open state in which the opening degree of the valve body is greater than zero degree, and
 wherein the valve housing includes a seating portion having a cylindrical shape and including the inner peripheral surface on which the valve seat surface and the flow passage surface are formed integrally,
 wherein a flat surface and a step portion extending inward from an upstream end of the flat surface are formed on the inner peripheral wall surface of the bypass flow passage,
 wherein the seating portion is configured such that an end surface of the seating portion and the step portion are in contact while the seating portion is fixed to the flat surface,
 wherein an inclined surface extending outward from upstream toward downstream is formed on the inner peripheral wall surface of the bypass flow passage, at a position upstream of the step portion, the inclined surface forming a width increasing; portion increasing an inner cross section and
 wherein, provided that, when the valve body transitions from the fully-closed state to the valve-open state, a first side is a side at which the outer peripheral portion of the valve body rotates toward a downstream side of the bypass flow passage and a second side is a side at which the outer peripheral portion of the valve body rotates toward an upstream side of the bypass flow passage,
 the outer peripheral portion of the valve body disposed on the second side is configured to pass through the width increasing portion.
2. An engine device including a two-stage supercharging system, comprising:
an engine;
an exhaust manifold into which exhaust gas discharged from the engine is introduced;
an exhaust system through which the exhaust gas discharged from the exhaust manifold flows;
a high-pressure stage supercharger having a high-pressure stage turbine configured to be driven by the exhaust gas discharged from the exhaust manifold; and
a low-pressure stage supercharger comprising a low-pressure stage turbine which is disposed downstream of the high-pressure stage supercharger in the exhaust system and which is configured to be driven by the exhaust gas discharged from the high-pressure stage supercharger, wherein the high-pressure stage supercharger comprises the turbine supercharger according to claim 1.

3. An engine device including a two-stage supercharging system, comprising:
- an engine;
- an exhaust manifold into which exhaust gas discharged from the engine is introduced;
- an exhaust system through which the exhaust gas discharged from the exhaust manifold flows;
- a high-pressure stage supercharger having a high-pressure stage turbine configured to be driven by the exhaust gas discharged from the exhaust manifold; and
- a low-pressure stage supercharger comprising a low-pressure stage turbine which is disposed downstream of the high-pressure stage supercharger in the exhaust system and which is configured to be driven by the exhaust gas discharged from the high-pressure stage supercharger, wherein the high-pressure stage supercharger comprises the turbine supercharger according to claim 1, and wherein the low-pressure stage supercharger comprises the turbine supercharger according to claim 1.

* * * * *